United States Patent [19]

Nagasato et al.

[11] Patent Number: 5,146,447
[45] Date of Patent: Sep. 8, 1992

[54] OPTICAL/OPTOMAGNETIC DISK APPARATUS

[75] Inventors: Makoto Nagasato; Masasumi Yana, both of Yokohama, Japan

[73] Assignee: Kabushiki Kaisha Toshiba, Kawasaki, Japan

[21] Appl. No.: 343,293

[22] Filed: Apr. 26, 1989

[30] Foreign Application Priority Data

Sep. 28, 1987 [JP] Japan ................. 62-243126
Dec. 11, 1987 [JP] Japan ................. 62-311880
Mar. 3, 1989 [JP] Japan ................. 1-51702

[51] Int. Cl.$^5$ ............................................. G11B 33/02
[52] U.S. Cl. ..................... 369/77.2; 360/99.06; 365/122
[58] Field of Search ............ 369/77.1, 77.2, 75.1, 369/75.2, 44.39, 270–271, 291–292, 13; 360/131, 132, 133, 97.01, 99.01, 99.06, 114, 118, 59; 365/120–122

[56] References Cited

U.S. PATENT DOCUMENTS

| | | | |
|---|---|---|---|
| 4,416,003 | 11/1983 | Suzuki | 369/75.2 |
| 4,545,003 | 10/1985 | Hirano et al. | 369/44.25 X |
| 4,701,895 | 10/1987 | Van Sant | 365/122 X |
| 4,706,232 | 11/1987 | Funada et al. | 365/122 X |
| 4,794,481 | 12/1988 | Suyama et al. | 369/77.2 X |
| 4,811,137 | 3/1989 | Muto et al. | 369/77.2 |
| 4,825,428 | 4/1989 | Toki | 365/122 X |
| 4,866,693 | 9/1989 | Odawara et al. | 369/77.2 X |
| 4,896,312 | 1/1990 | Odawara et al. | 369/291 X |

FOREIGN PATENT DOCUMENTS

62-51072  3/1987  Japan .

*Primary Examiner*—William M. Shoop, Jr.
*Assistant Examiner*—David Martin
*Attorney, Agent, or Firm*—Oblon, Spivak, McClelland, Maier & Neustadt

[57] ABSTRACT

An optomagnetic disk apparatus includes a holder for holding a cartridge which stores an optomagnetic disk therein and which is moved while a cartridge having an openable shutter is held therein. Shutter openers for opening/closing the shutter are movably arranged on the holder. A wire is looped between the shutter openers. Ends of the wire are fixed to the frame. When the holder is moved, the wire is pulled, and the shutter openers are selectively moved to open/close the shutter. The optomagnetic disk apparatus also includes a magnet unit for applying an external magnetic field to the optomagnetic disk when information is erased from or written in the optomagnetic disk. The magnet unit has a flat sectional shape and is rotatable.

18 Claims, 25 Drawing Sheets

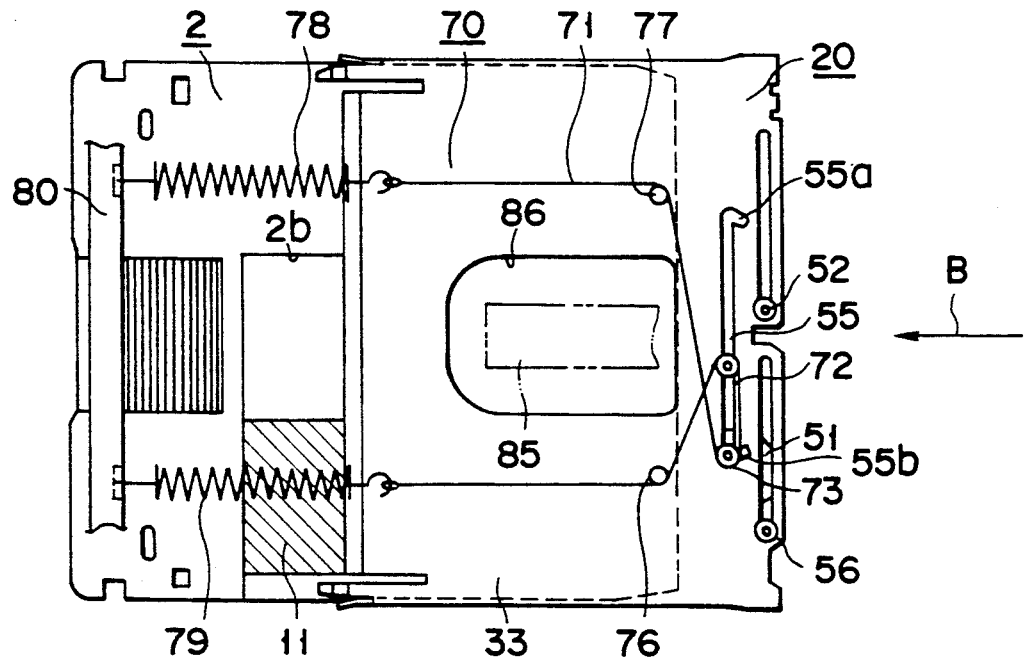
F I G. 14
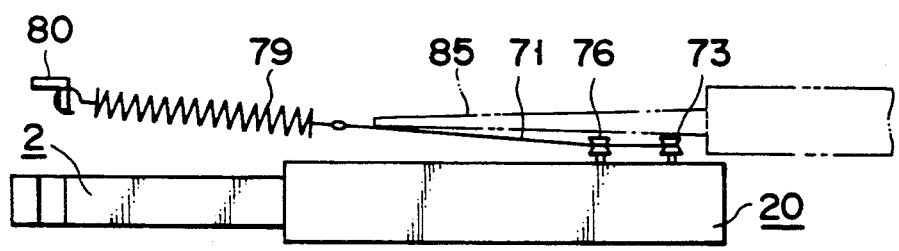
F I G. 15

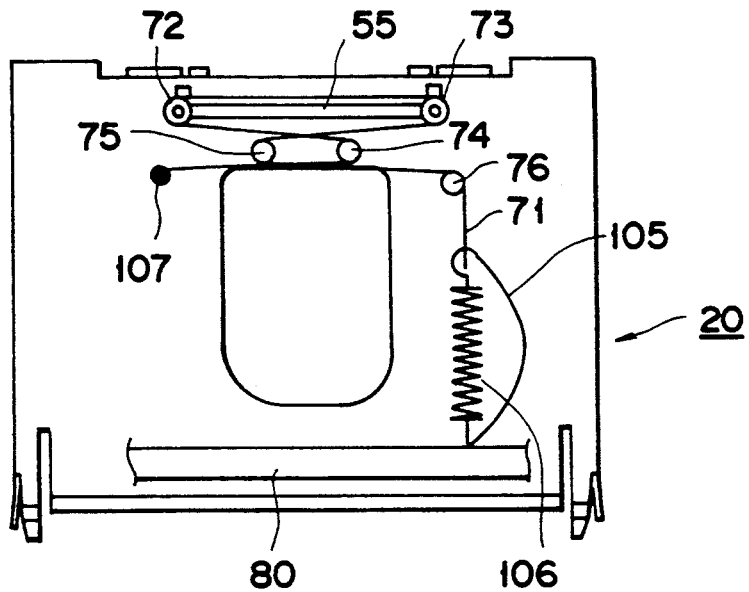
F I G. 29
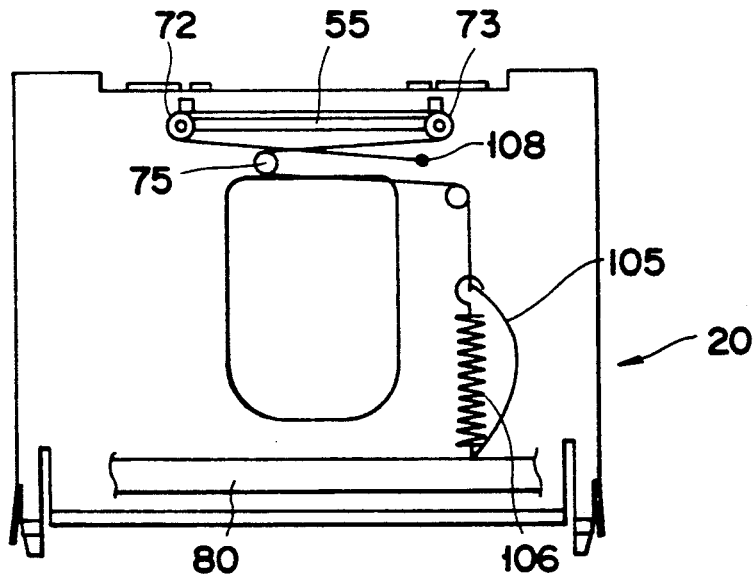
F I G. 30

OPTICAL/OPTOMAGNETIC DISK APPARATUS

BACKGROUND OF THE INVENTION

1. Field of the Invention

The present invention relates to an optical/optomagnetic disk apparatus for driving an optical disk and/or an optomagnetic disk which can be read/write accessed any number of times and for performing read/write access. More particularly, the present invention relates to improvements of a mechanism for opening/closing a shutter of a cartridge which stores a disk, and a mechanism for moving a magnet for applying an external magnetic field during read/write access of the optomagnetic disk.

2. Description of the Related Art

An optical disk has advantages in that information can be recorded at a high density, the disk is almost free from noise, and the disk is not brought into mechanical contact with a head. However, the optical disk has disadvantages in that information written therein cannot be erased and information cannot be written therein again.

In order to overcome the above disadvantages, an optomagnetic disk capable of performing erase and write operations any number of times has been developed. This optomagnetic disk is stored in and protected by a cartridge in the same manner as in the optical disk. An openable shutter is arranged in the cartridge. The shutter is opened/closed by a shutter opening/closing mechanism incorporated in the optomagnetic disk apparatus, and an erase, read, or write operation is performed. However, an external magnetic field must be applied to the optomagnetic disk at the time of the erase or write operation. For this purpose, a magnet unit must be arranged in the optomagnetic disk apparatus to apply an external magnetic field to the disk. In the optomagnetic disk apparatus, the magnet unit must be arranged, and an exclusive structure for moving the magnet unit is required. Therefore, a conventional optical disk apparatus cannot be employed without modifications.

The reason why the exclusive structure is required in the optomagnetic apparatus will be described. The structure of an optical apparatus disclosed in Japanese Patent Application No. 61-137480 as an example of the conventional optical disk apparatus will be described with reference to FIGS. 1 to 4.

In order to improve operability of the apparatus and protect the optical disk, the cartridge which stores the optical disk therein can be inserted in the apparatus. A shutter opening/closing mechanism for automatically opening/closing the shutter of the cartridge is incorporated in the apparatus.

Reference symbol a denotes a cartridge which stores an optical disk as an information recording medium; and b, a cartridge holder for holding the cartridge a. The cartridge holder b can be moved in an insertion direction.

A cam plate d is pivotally mounted on the cartridge holder b through a cam plate center-of-rotation pin c. A substantially elliptical groove e is formed in the cam plate d. A cam plate drive/fixing pin f arranged on a stationary member is engaged in the groove e. The cam plate d is pivoted about the pin c serving as the center of rotation of the cam plate d upon movement of the cartridge holder b.

Shutter openers (schematically illustrated) k for sides A and B are arranged in the cartridge holder b. Drive pins g which can engage with a guide groove h and guide pins m which can engage with a guide groove n extend on the shutter openers k, respectively. The shutter openers k are movable in the opening/closing direction of the shutter i. The shutter openers k have an engaging portion (not shown) engaged with a groove n formed in the shutter i. The drive pins g integral with the shutter openers k are interlocked with pivotal movement of the cam plate d. One of the shutter openers k is moved depending on side A or B of the cartridge a, thereby opening/closing the shutter i.

Note that reference symbol o denotes a cam plate fixing pin.

The cartridge a is inserted from a cartridge insertion/ejection port (not shown) of the apparatus to a predetermined position. The cartridge a is held by the cartridge holder b, as shown in FIG. 2. At this time, snapper seats b formed on side end faces of the cartridge p are engaged with snappers (not shown) incorporated in the cartridge a. Therefore, the cartridge a is firmly held in the cartridge holder b and the cam plate d is slightly pivoted clockwise.

When the cartridge holder b is moved in a direction for causing a holder moving mechanism (not shown) to receive the cartridge holder b, the cam plate drive/fixing pin f is moved within the groove e of the cam plate d, as shown in FIG. 3. The cam plate d is pivoted about the cam plate center-of-rotation pin c and is moved to the position shown in FIG. 4.

Upon pivotal movement of the cam plate d, one drive pin g is moved to the right, and the corresponding shutter opener k is moved to the right. Therefore, the shutter i is open by about 40 mm in a direction perpendicular to the insertion direction of the cartridge holder a.

In order to eject the cartridge holder a, operations are performed in the reversed order, and the shutter i is closed. The shutter opening/closing mechanism of the cartridge of the conventional optical disk uses the cam plate d for opening/closing the shutter.

In the conventional shutter opening/closing mechanism using the cam plate, when a magnet unit for generating a write/erase magnetic field is arranged, the magnet unit must be arranged at the position of the shutter opening/closing cam plate due to the limitations of component layout.

For this reason, the magnet unit for generating the write/erase magnetic field cannot oppose the optomagnetic disk due to the presence of the cam plate. Therefore, the above arrangement cannot be directly employed in the optomagnetic disk apparatus.

There is much room for improving a support structure of the magnet unit. Support structures of the magnet unit are disclosed in Japanese Patent Disclosure (Kokai) Nos. 62-8345, 62-14352, and 61-222001. Round and square rod-like permanent magnets are used as magnet units in optomagnetic disk apparatuses. In this case, in order to obtain a sufficient magnetic field on an optomagnetic disk mounted on a turntable, the magnet unit must oppose the optomagnetic disk in a proximate state. However, when the magnet unit opposes the optomagnetic disk in a proximate state, the cartridge of the optomagnetic disk abuts against part of the magnet unit during insertion of the optomagnetic disk into the magnetic disk apparatus. There is then a fear of damaging the magnet unit and the cartridge. In a conventional arrangement, a magnet unit moving mechanism is arranged and the entire magnet unit is retracted from the moving path of the cartridge of the optomagnetic disk to a standby position, thereby preventing interference between the cartridge of the optomagnetic disk and the magnet unit. In the write or erase mode, the magnet unit is moved from the standby position to a predetermined set position. However, the presence of the magnet unit moving mechanism undesirably results in a bulky optomagnetic disk apparatus.

According to another conventional proposal, a strong magnetic field is generated by using a magnet consisting of a rare earth element to increase a distance between the optomagnetic disk and the set position of the magnet unit in the write or erase mode. Abutment of the cartridge of the optomagnetic disk during insertion or ejection of the optomagnetic disk into or from the optomagnetic disk apparatus can be prevented. In this case, however, a relatively expensive rare earth element must be used, thus resulting in high cost.

SUMMARY OF THE INVENTION

The present invention has been made to eliminate the conventional drawbacks described above.

It is a first object of the present invention to improve a mechanism for opening/closing a shutter of a cartridge of an optomagnetic disk and to assure a space required for the magnet unit during writing or erasure of information.

It is a second object of the present invention to provide a mechanism for supporting/moving the magnet unit, which allows an arrangement of the magnet unit near the surface of the optomagnetic disk, which can prevent interference between the magnet unit and the cartridge of the disk, and which can reduce the size of the optomagnetic disk apparatus.

In order to achieve the first object of the present invention, the shutter opening/closing mechanism for opening/closing the shutter of the cartridge comprises a cartridge holder, movable in an insertion direction of the cartridge, for holding the cartridge, a fixing member arranged to oppose a moving path of the cartridge holder, a shutter opener, slidably disposed in the cartridge holder, for opening/closing the shutter upon movement thereof, a thread or wire which is looped between a guide member integrally formed with the shutter opener and a guide member disposed in the cartridge holder and both ends of which are fixed to the fixing member, and an opener moving means for moving the shutter opener upon movement of the cartridge holder.

Since the shutter opening/closing mechanism has the above arrangement, design flexibility can be improved, the space for the magnet unit can be easily assured, and at the same time the shutter arranged in the cartridge can be properly opened or closed. This mechanism can be employed when an information recording medium is an optical disk or an optomagnetic disk.

In order to achieve the second object of the present invention, the external magnetic field unit for applying an external magnetic field to the optomagnetic disk during erasure or writing of information is constituted by a magnet unit having a flat cross section and magnets at both sides of a rotating shaft thereof. The external magnetic field unit also includes a magnet unit drive mechanism for rotating the magnet unit from a parallel position where the longitudinal direction of the cross section is almost parallel to the optomagnetic disk to a predetermined angular position. The external magnet field unit further includes a magnet unit position control means for holding the magnet unit at the parallel position during an operation except for the write or erase mode of the optomagnetic disk and the predetermined angular position in the write or erase mode of the optomagnetic disk.

Since the magnet unit is held in the parallel position during an operation except for the write or erase mode of the optomagnetic disk, abutment of the cartridge of the optomagnetic disk against the magnet unit during loading/unloading of the optomagnetic disk can be prevented. In the write or erase mode of the optomagnetic disk, the magnet unit is pivoted about its pivotal axis, and one of the magnets in the magnet unit can come close to the disk surface of the optomagnetic disk.

BRIEF DESCRIPTION OF THE DRAWINGS

The present invention will be apparent from the following detailed description of preferred embodiments in conjunction with the accompanying drawings, in which:

FIG. 14 is a side view showing an operating state of the shutter opening/closing mechanism;

FIG. 15 is a side view of the mechanism shown in FIG. 12;

FIG. 29 is a plan view showing an eight embodiment of a shutter opening/closing mechanism according to the present invention;

FIG. 30 is a plan view showing a ninth embodiment of a shutter opening/closing mechanism according to the present invention;

DETAILED DESCRIPTION OF THE PREFERRED EMBODIMENTS

A first embodiment of the present invention will now be described with reference to FIGS. 5 to 15.

Figure 1:
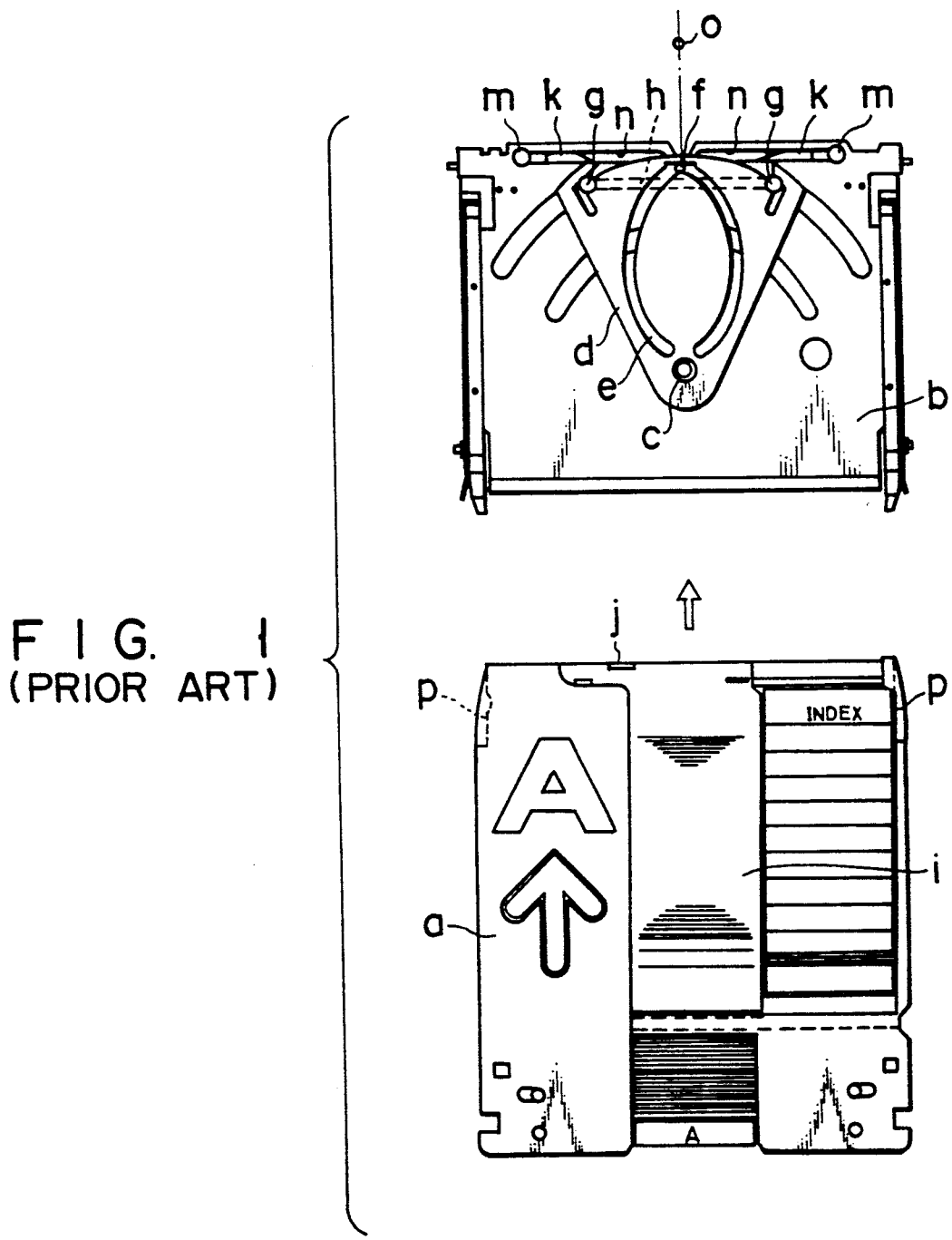
FIG. 1 is a plan view of a conventional shutter opening/closing mechanism.
Figure 2:
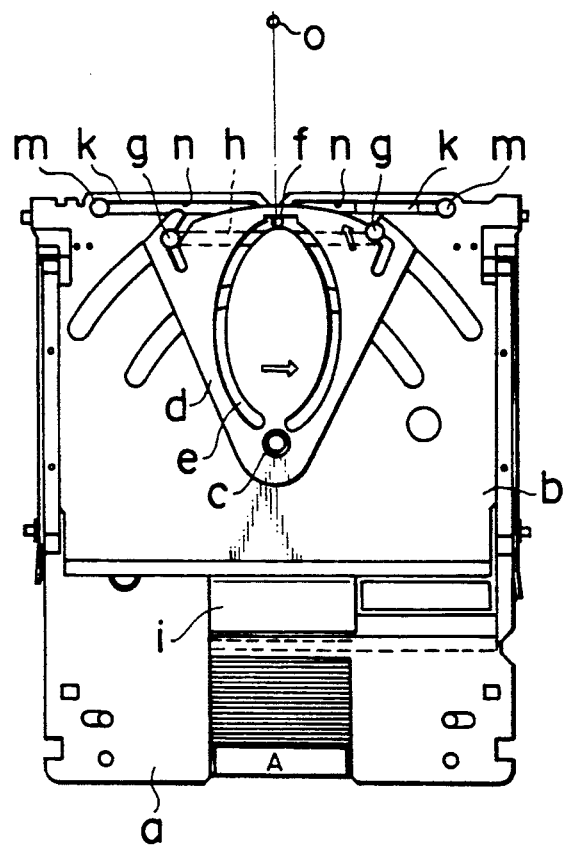
FIGS. 2 to 4 are plan views showing operating states of the mechanism shown in FIG. 1.
Figure 3:
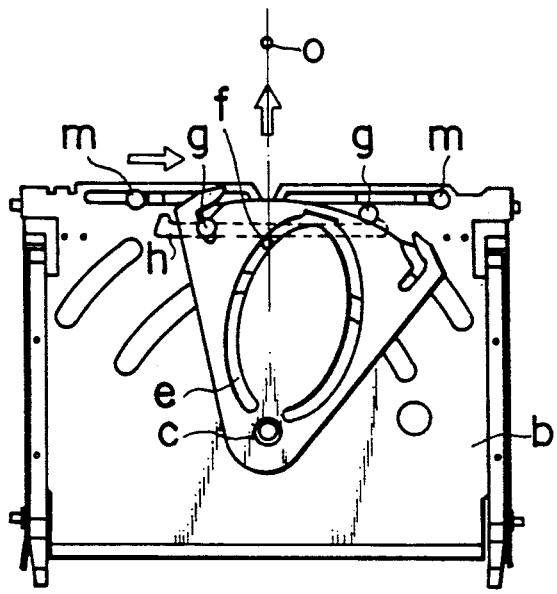
Figure 4:
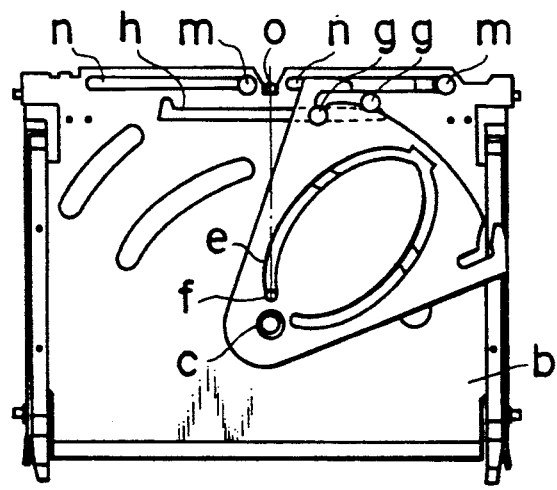
Figure 5:
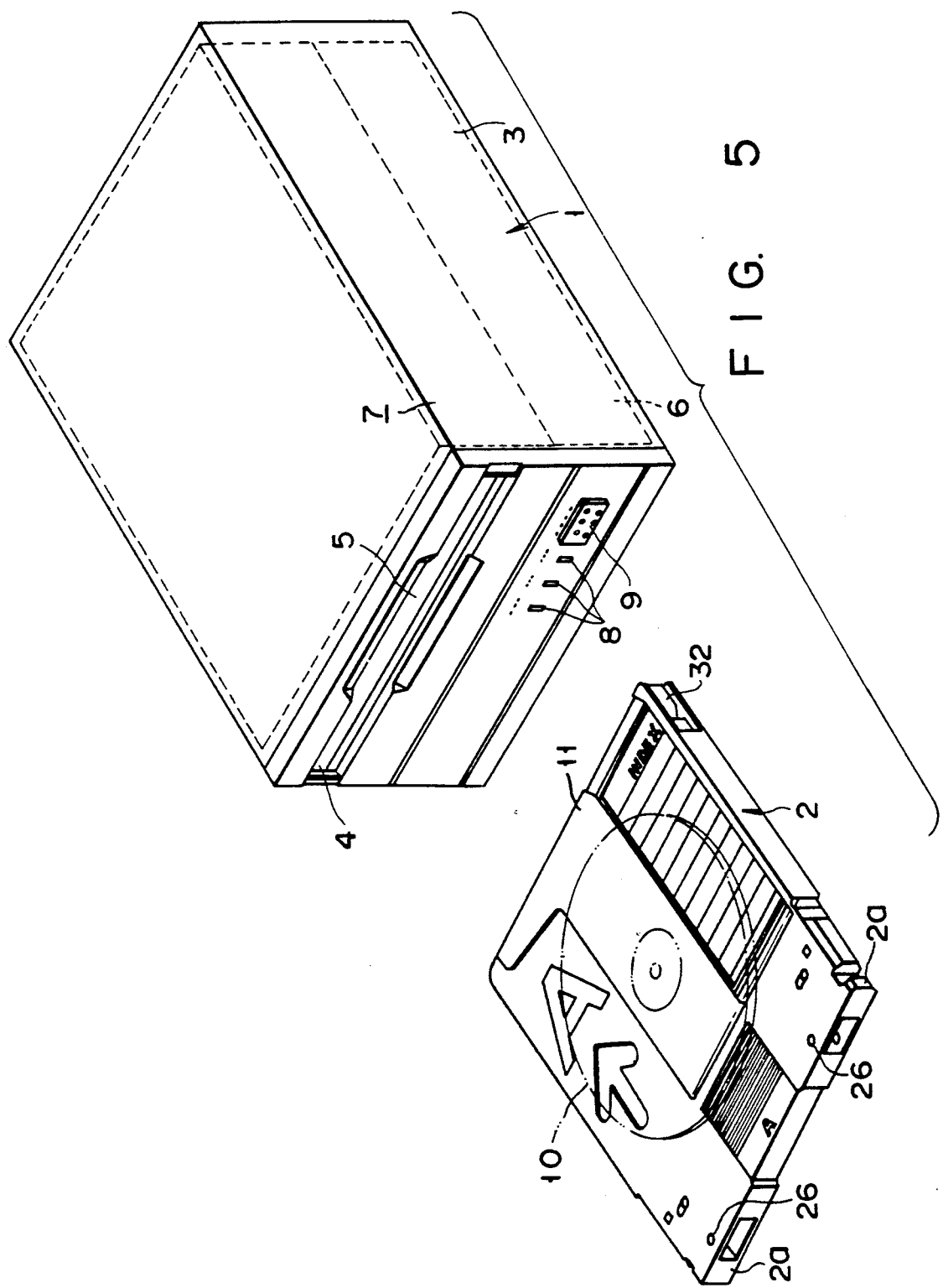
FIG. 5 is a perspective view showing an apparatus according to the present invention.

FIG. 5 shows an outer appearance of an optomagnetic disk apparatus 1 and a cartridge 2 driven by the optomagnetic disk apparatus 1. The optomagnetic disk apparatus has the following structure. Reference numeral 3 denotes an apparatus housing. A disk cartridge insertion/ejection port 5 having an openable shutter 4 is formed in the upper portion of the front surface of the housing 3. A drive base mechanism (FIG. 7), a loading mechanism (FIG. 8), and a control circuit (not shown) for driving the drive base mechanism 6 and the loading mechanism 7 are arranged in the housing 3. State indicators 8 and a cartridge eject switch 9 are arranged at the lower right portion of the front surface of the housing 3.

Figure 6:
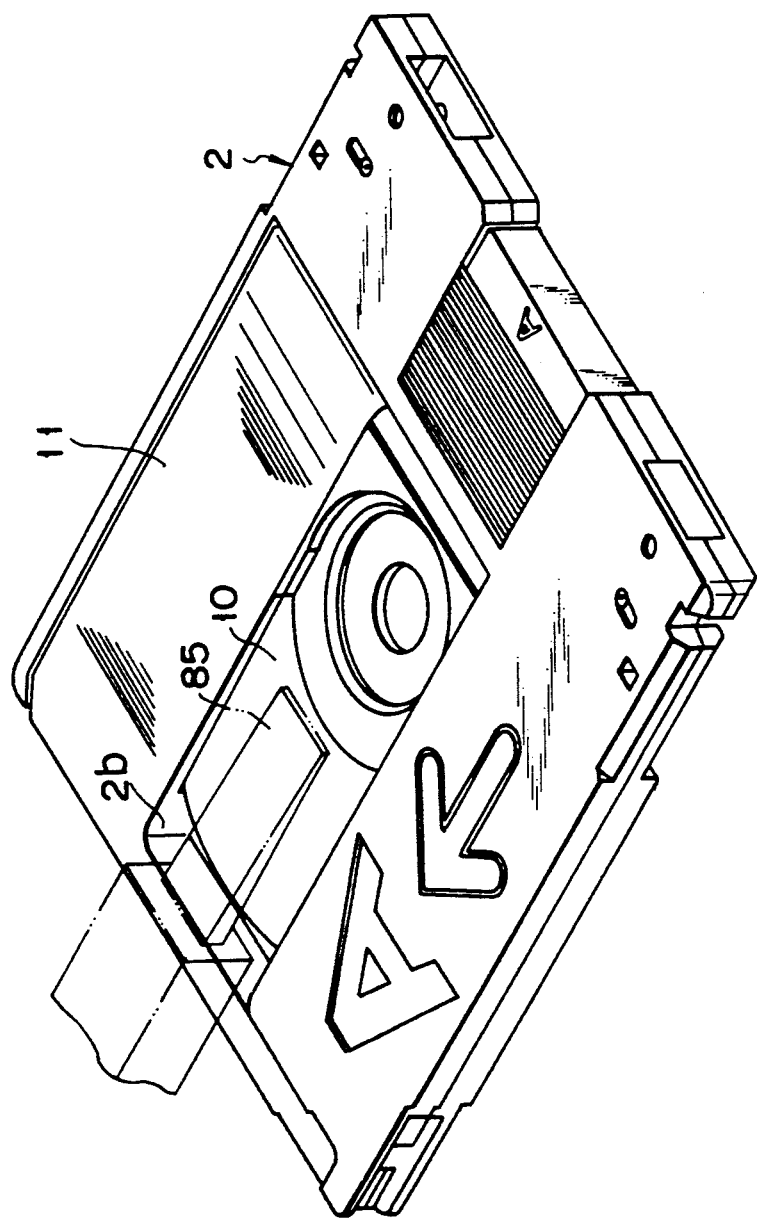
FIG. 6 is a perspective view of a cartridge.

As shown in FIG. 6, an information recording medium such as an optomagnetic disk 10 having a diameter of about 130 mm is stored in the cartridge 2. Sides A and B of the disk 10 can be used. A shutter 11 for partially exposing the disk 10 through a window 2b (FIG. 6) is slidably mounted on the cartridge 2.

Figure 7:
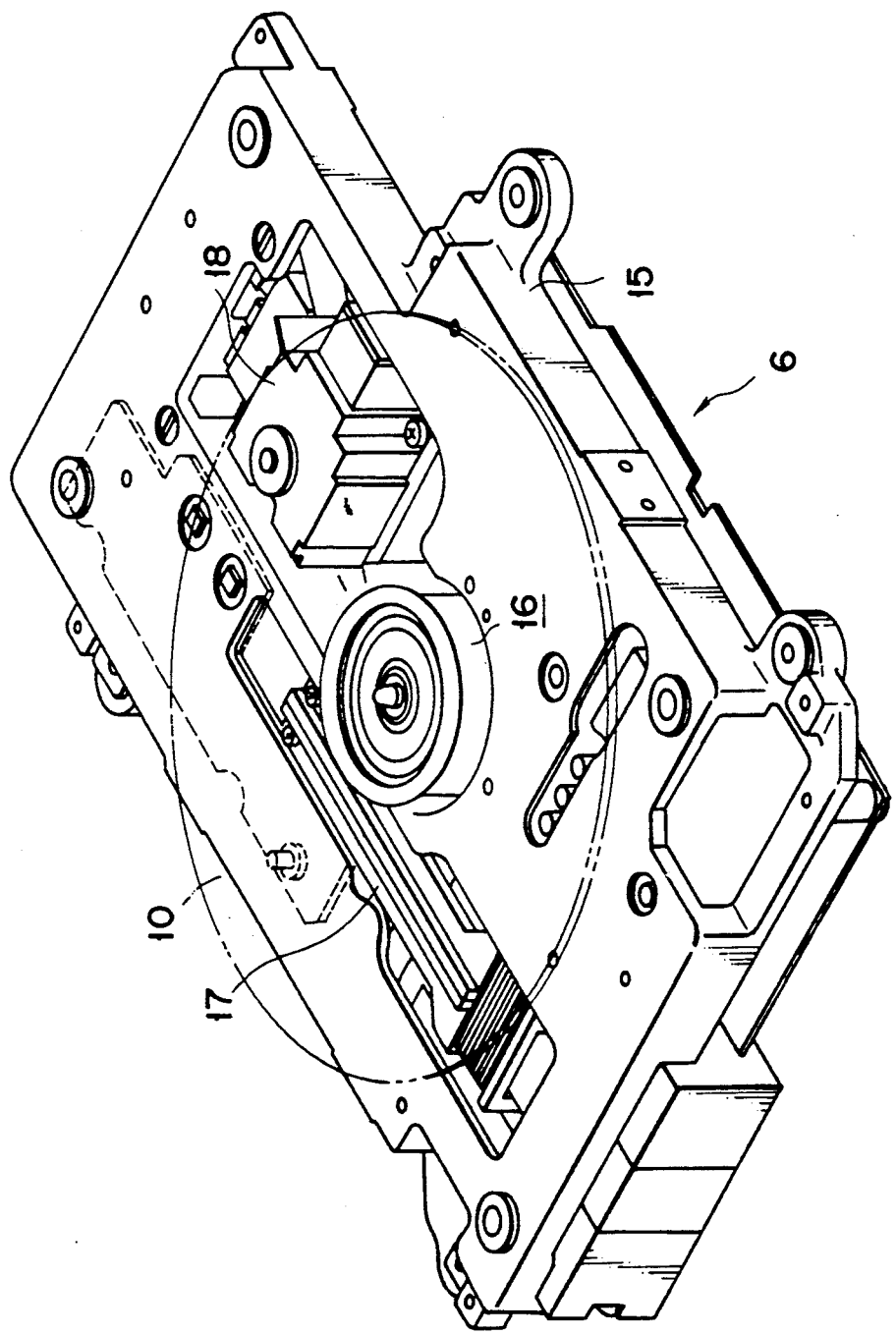
FIG. 7 is a perspective view of a drive base mechanism.

As shown in FIG. 7, the drive base mechanism 6 includes a disk rotation motor (spindle motor) 16 for holding and rotating the disk 10, and a write/read head (optical head) 18 for causing a linear motor 17 to radially move the disk 10 to perform information processing of an information recording layer on the lower surface of the disk 10.

Figure 8:
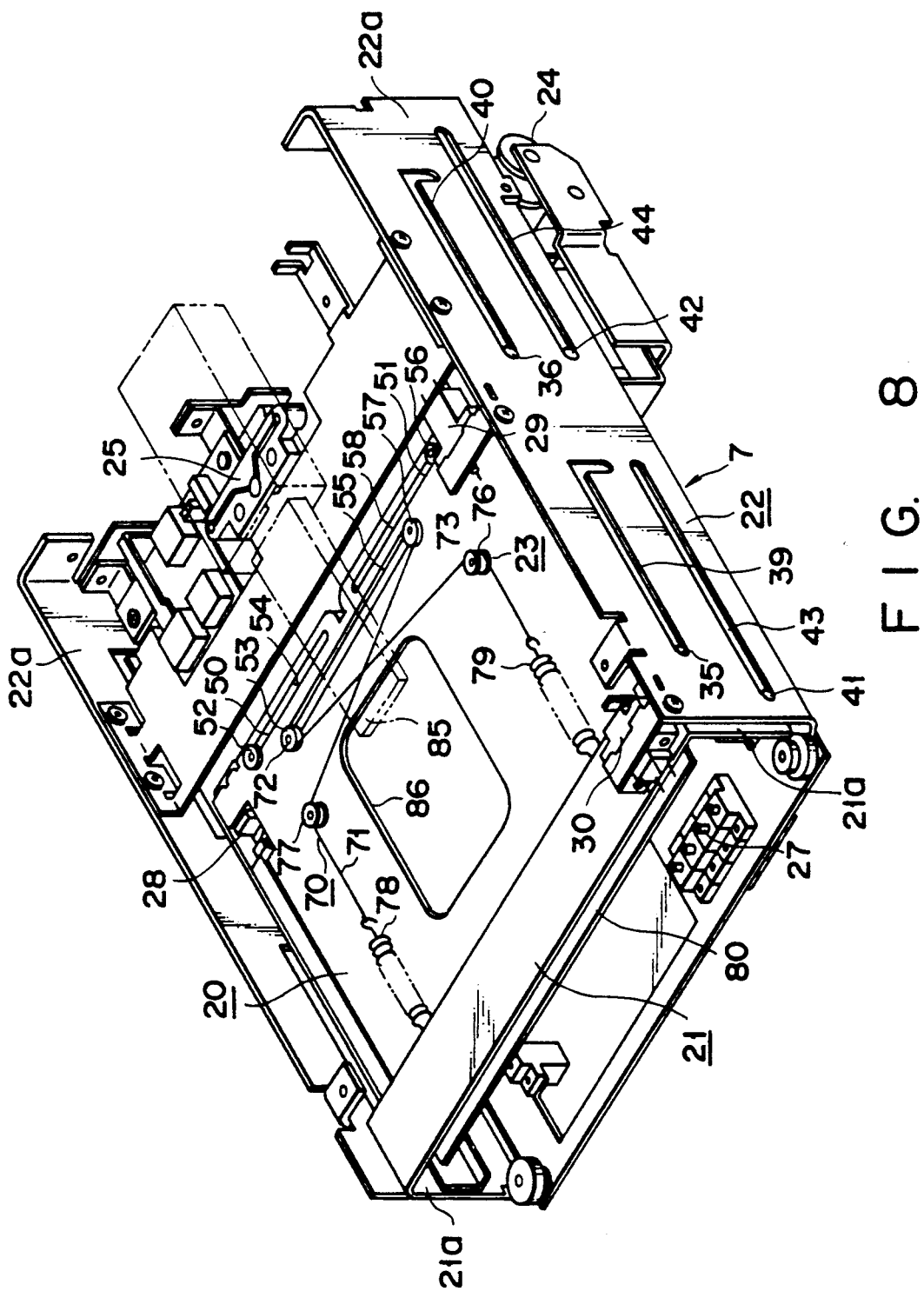
FIG. 8 is a perspective view of a loading mechanism.

As shown in FIG. 8, the loading mechanism 7 includes three main components, i.e., a cartridge holder (to be referred to as a holder hereinafter) 20 for holding the cartridge 2, a cam member 21 for moving the holder 20 between an extended position and a retracted position, and a guide member 22 for guiding the cam member 21 and the holder 20.

A shutter opening/closing mechanism 23 for opening/closing the shutter 11 of the cartridge is incorporated in the holder 2. A cam member driving means 24 for driving the cam member 21 is arranged in the guide member 22. An optical detecting means 25 for detecting opening/closing of the shutter 11, an ID push switch 27 for detecting an ID hole 26 of the cartridge 2, a stop switch 29 operated during cartridge insertion, and a stop switch 30 operated during cartridge ejection are also arranged in the guide member 22.

Figure 9:
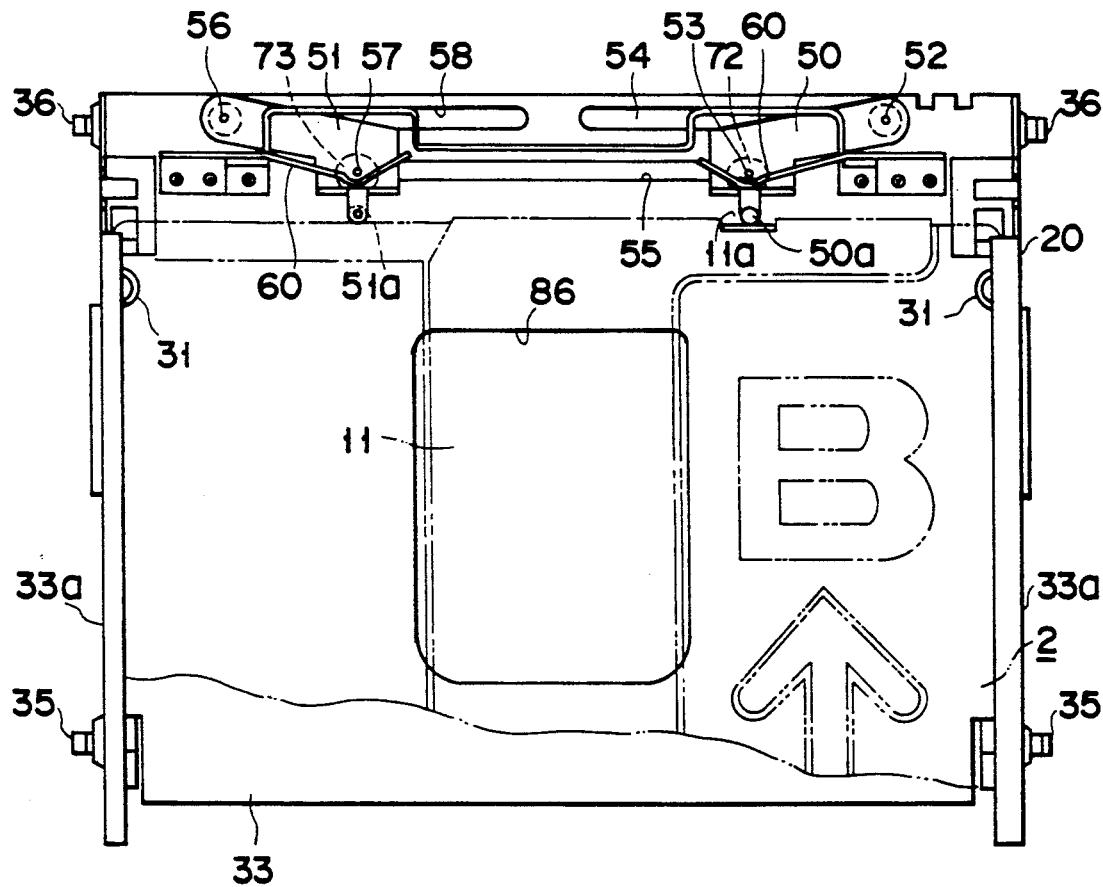
FIG. 9 is a bottom view of a portion showing a first embodiment of a shutter opening/closing mechanism according to the present invention.

Snappers 31 comprising leaf springs are mounted on the side surfaces of the holder 20, as shown in FIG. 9. When the cartridge 2 is manually inserted into the holder 20, the snappers 31 are elastically fitted in snapper seats 32 formed on the side surfaces of the cartridge 2, so that the cartridge 2 is firmly held. At this time, an operation element of a cartridge insertion detection switch 28 (FIG. 8) is depressed by the cartridge 2, so that it is determined that the cartridge 2 is correctly inserted. Therefore, the cam driving means 24 starts its operation.

When the cartridge 2 is inserted such that its rear end is inserted first, projections 2a formed at the rear end portions of the cartridge 2 abut against the proximal portions of the snappers 31, respectively. Further insertion of the cartridge 2 is thus prevented. In this case, the operation element of the insertion detection switch 28 is not depressed by the cartridge 2. Therefore, the loading operation of the holder 20 is not performed, and reverse insertion of the cartridge can thus be perfectly prevented.

Guide pins 35 and 36 extend from each side frame portion 33a of a base 33 of the holder 20. The guide pins 35 and 36 respectively extend through first and second cam grooves (not shown) formed in each side frame portion 21a of the cam member 21 and are guided in guide grooves 39 and 40 formed in each side frame portion 22a of the guide member 22.

Guide pins 41 and 42 extend from each side frame portion 21a respectively. The guide pins 41 and 42 are guided in guide grooves 43 and 44 formed in each side frame portion 22a of the guide member 22. The cam member 21 is movably guided along the insertion direction of the cartridge 2.

When the cartridge 2 is inserted to a position where the cartridge insertion detection switch 28 is operated, the motor of the cam member drive means 24 is operated to move the cam member 21 in the direction of depth. At this time, the holder 20 is also moved together with the cam member 21. The shutter of the cartridge 2 is opened upon operation of a shutter opening/closing mechanism (to be described later), as shown in FIG. 6. When the cartridge 2 reaches a predetermined position, horizontal movement of the holder 20 is stopped, and only the cam member 21 continues to move. The holder 20 is moved downward. The disk 10 is mounted on the disk rotation motor 16.

At this time, the stop switch 29 during insertion is operated by the projection extending on the cam member 21, and the cam member driving means 24 is stopped.

During ejection of the cartridge, the cam member driving means 24 is operated in accordance with a cartridge eject signal, and the cam member 21 is moved toward the direction of the disk cartridge insertion/ejection port 5. The cartridge is operated in a reversed order. That is, the holder 20 is moved upward, and the disk 10 is removed from the disk rotation motor 16. The cartridge 2 is moved backward until part of the cartridge 20 appears from the disk cartridge insertion/ejection port 5. In this state, upon depression of the stop switch 30 operated during ejection, the cam member 21 is stopped.

The shutter opening/closing mechanism is operated during ejection of the cartridge. The shutter 11 of the cartridge 2 is closed, and at the same time, the projection of the elastic lever is engaged with the lock window of the shutter 11, thereby locking the shutter 11.

The shutter opening/closing mechanism 23 for opening/closing the shutter 11 of the cartridge 2 will now be described below.

As shown in FIG. 9, A- and B-side shutter openers 50 and 51 are arranged on the lower surface of the base 33 of the holder 20. When the A- and B-side shutter openers 50 and 51 are located at their home positions, their engaging portions 50a and 51a are selectively engaged with a recess 11a of the shutter 11 of the inserted cartridge 2.

More specifically, when the cartridge 2 is inserted such that the side A faces upward, the engaging portion 50a of the shutter opener 50 is engaged with the recess 11a of the shutter 11. However, when the cartridge 2 is inserted such that the side B faces upward, the engaging portion 51a of the shutter opener 51 is engaged with the recess 11a of the shutter 11.

Guide pins 52 and 53 are respectively engaged with guide grooves 54 and 55 formed in the base 33 extend on the A-side shutter opener 50. Guide pins 56 and 57 are respectively engaged with a guide groove 58 and the guide groove 55 formed in the base 33 extend on the B-side shutter opener 51. The shutter openers 50 and 51 guided along these guide grooves are movable in the opening/closing direction of the shutter 11. The shutter openers 50 and 51 are biased against the cartridge 2 by leaf springs 60 mounted on the base 33.

The shutter openers 50 and 51 are movable by an opener moving means 70 to be described below.

Figure 10:
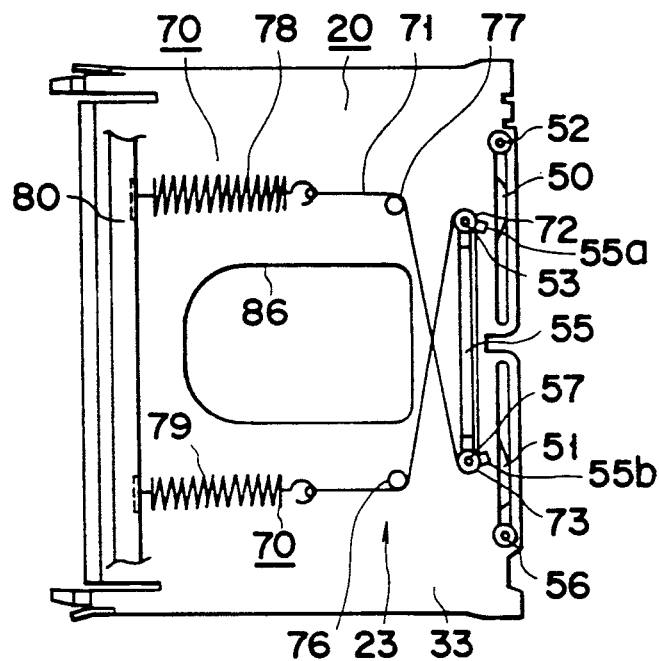
FIG. 10 is a plan view of the shutter opening/closing mechanism.
Figure 11:
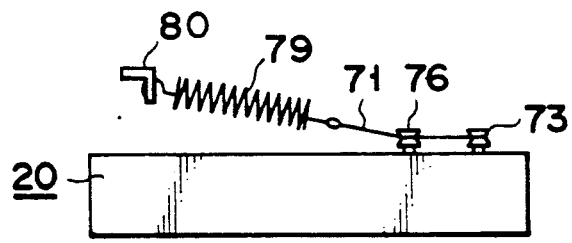
FIG. 11 is a side view of the shutter opening/closing mechanism.

As shown in FIGS. 8, 10, and 11, the guide pins 53 and 57 extending from the shutter openers 50 and 51 arranged in the holder 20 include rotatable pulleys 72 and 73 serving as guide members. A flexible member, e.g., a wire 71 is looped between the pulleys 72 and 73. The wire 71 crosses and is guided to two guide members, e.g., pulleys 76 and 77 arranged in the holder 20. The wire 71 is then bent at 90°. Both ends of the wire 71 are fixed to a stationary member, e.g., a stay 80 through tension coil springs 78 and 79. Therefore, a predetermined tension acts on the wire 71 through the coil springs 78 and 79.

An opening 86 is formed at the central portion of the base 33 of the holder 20. A write/erase magnetic field generating means, e.g., a magnet unit 85 opposes near the surface of the disk 10 through the opening 86.

One of the shutter openers 50 and 51 is locked depending on the side A or B of the cartridge 2. More specifically, stoppers 55a and 55b bent at an angle of 90° or more are formed at both ends of the guide groove 55 for guiding the shutter openers 50 and 51. As shown in FIG. 9, when the cartridge 2 is inserted such that the side A faces upward (since FIG. 9 is a bottom view, and the side B is illustrated), the engaging portion of the A-side shutter opener 50 is engaged with the recess 111a of the shutter 11 of the cartridge 2. Since such a recess is not formed at a shutter portion corresponding to the position of the engaging portion 51a of the shutter opener 51. The B-side shutter opener 51 is urged by the cartridge, fitted in the stopper 55b of the guide groove 55, and is locked. Note that the A-side shutter opener 50 is locked when the cartridge is inserted such that the side B faces upward.

Figure 12:
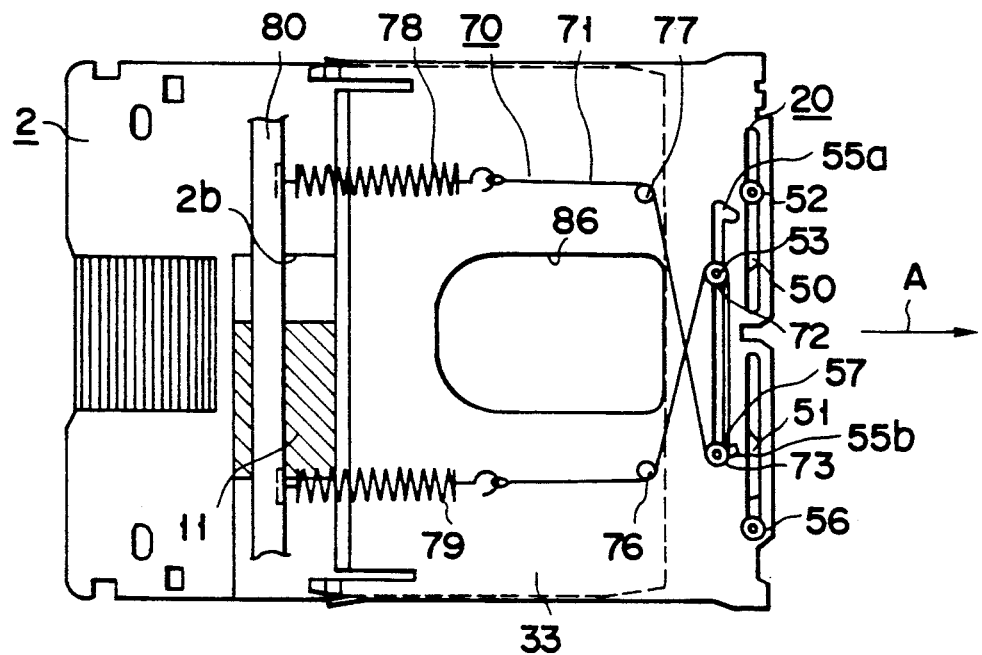
FIG. 12 is a side view showing an operating state of the shutter opening/closing mechanism.
Figure 13:
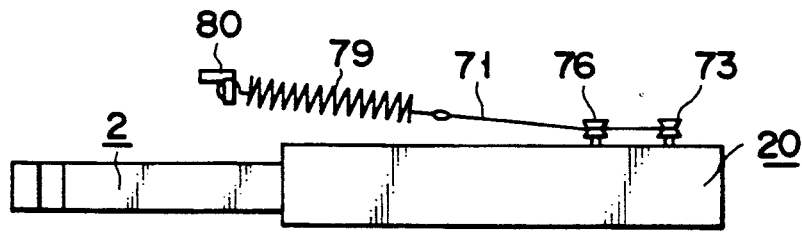
FIG. 13 is a side view of the mechanism shown in FIG. 12.

FIGS. 12 and 13 show states wherein the cartridge 2 is inserted such that the side A faces upward, so that the B-side shutter opener 51 is kept locked. When the holder 20 which holds the cartridge 2 therein is moved in a direction of an arrow A, the coil springs 78 and 79 hooked between the holder 20 and the stationary stay 80 are extended to cause a tension to act on the wire 71. Therefore, the unlocked A-side shutter opener 50 is moved to open the shutter 11.

FIGS. 14 and 15 show states wherein the holder 20 is conveyed to a final set position, and the shutter 11 is fully open. In this case, as shown in FIG. 6, the magnet unit 85 as the write/erase magnetic field generating means opposes the surface of the disk 10 through the opening 86 formed at the central portion of the base 33 of the holder 20.

An operation for closing the shutter 11 will now be described below. Upon movement of the cartridge 2 in the ejection direction (i.e., a direction of an arrow B in FIG. 14), a tension of the wire 71 is gradually released, and the shutter 11 is gradually closed by a biasing force of a shutter closing spring (not shown) incorporated in the cartridge 2. At this time, the shutter opener 50 kept engaged with the shutter 11 is moved and returned to the home position where the shutter 11 is completely closed.

When the cartridge 2 is inserted such that the side B faces upward, the B-side shutter opener 51 is moved, and the operation for opening/closing the shutter 11 is performed in the same manner as described above.

A mechanism for supporting and moving the magnet unit 85 is arranged as follows. As described above, the opening 86 for causing the write/erase magnetic field generating means, e.g., the magnet unit 85, to oppose the surface of the disk 10 is formed at the central portion of the base 33 of the holder 20.

Figure 16:
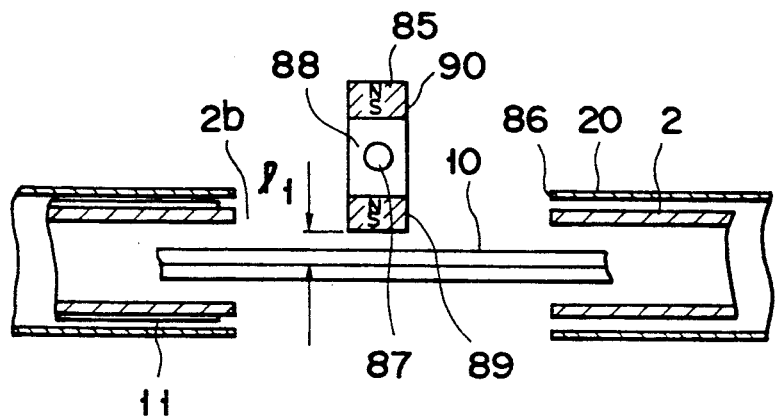
FIG. 16 is a sectional view of a magnet unit and a first embodiment of its drive mechanism.
Figure 17:
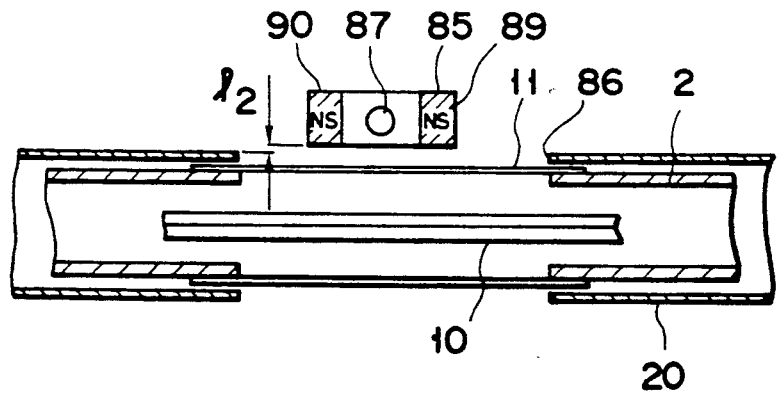
FIG. 17 is a view corresponding to FIG. 16 to show another operating state.
Figure 18:
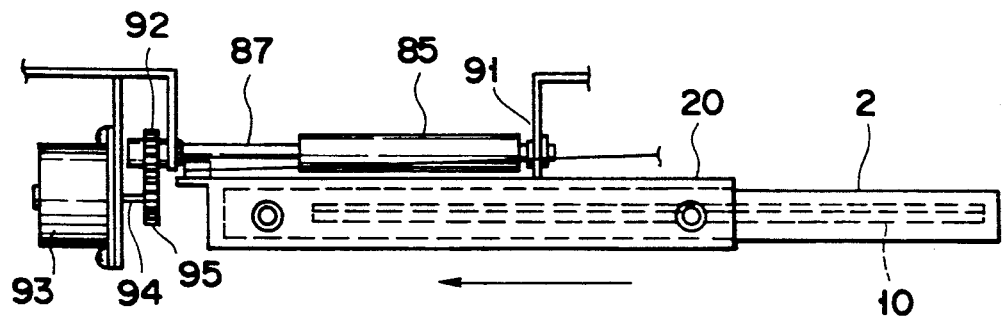
FIG. 18 is a side view of a magnet unit and its drive mechanism.
Figure 19:
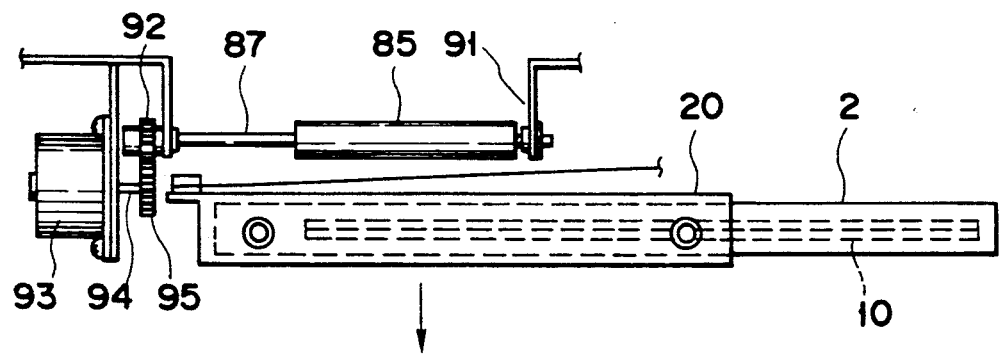
FIGS. 19 and 20 are views corresponding to FIG. 18 during operations.

As shown in FIGS. 16 to 20, permanent magnets 89 and 90 are arranged at both sides of a magnet holder 88 which is rotated about a rotating shaft 87. The magnet unit 85 has a flat sectional shape in a direction perpendicular to the rotating shaft 87. The permanent magnets are arranged along the longitudinal direction of the sectional shape. In this case, the permanent magnets 89 and 90 at both sides of the magnet holder 88 are adhered to adhesion surfaces such that their polarities are opposite to each other. For example, one permanent magnet 89 (first magnet) has an S pole on the surface adhered to the magnet holder 88, but the other permanent magnet 90 (second magnet) has an N pole on the surface adhered to the magnet holder 88. The rotating shaft 87 of the magnet holder 88 is rotatably supported by a bearing 91. A gear 92 is fixed to one end of the rotating shaft 87. The gear 92 is meshed with a gear 95 fixed on a rotating shaft 94 of a stepping motor 93. The stepping motor 93 drives the magnet unit 85 from a parallel position where the longitudinal direction of the section of the magnet unit 95 is almost parallel to the surface of the disk 10 to a predetermined angular position where the longitudinal direction is almost perpendicular to the surface of the disk 10. The stepping motor 93 is controlled by a conventional known control circuit (not shown). In a mode except for the write or erase mode of the disk 10, the magnet unit 85 is set at the parallel position, as shown in FIG. 17. In the write or erase mode of the disk 10, the magnet unit 85 is rotated to the predetermined angular position, as shown in FIG. 16.

During an operation (FIG. 18) for moving the cartridge 2 (inserted from the disk cartridge insertion/ejection port 5) together with the holder 20 in the horizontal direction, or during an operation (FIG. 19) for moving the holder 20 (received to the predetermined position) downward, the magnet unit 85 is held at the parallel position, as shown in FIG. 17. In this case, a gap $l_2$ between the magnet unit 85 and the holder 20 during horizontal movement is set to fall within about 0.5 to 1 mm.

When the cartridge 2 is conveyed to the final position, the shutter 11 is fully open. In this case, the magnet unit 85 opposes the surface of the disk 10 through the opening 86 formed at the central portion of the base 33 of the holder 20.

Figure 20:
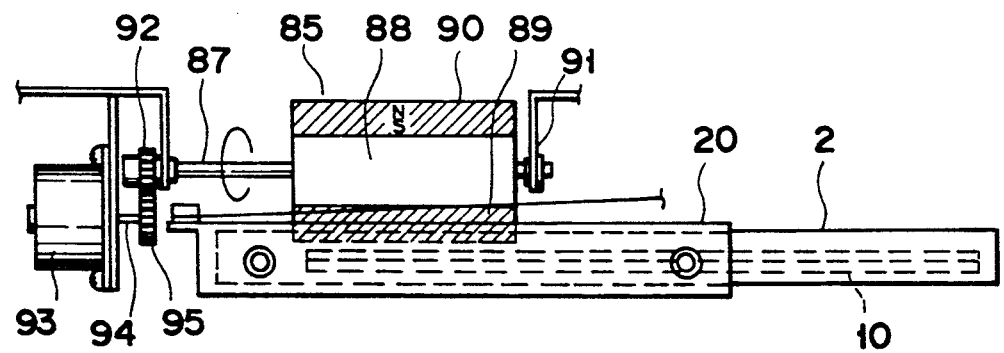

In the write/erase mode of the disk 10, the magnet unit 85 is rotated to the predetermined angular position almost perpendicular to the surface of the disk 10, as shown in FIGS. 16 and 20. In this state, information is written in or erased from the disk 10. At this time, the distal end of one magnet, e.g., the first magnet 89 of the magnet unit 85, is inserted inside the cartridge 2 through the opening 86 of the holder 20 and the window 2b of the cartridge 2 and is spaced apart from the recording film surface of the disk 10 by a distance $l_1$ in a proximate state. Note that a magnetic field having a perpendicular orientation component of 400 to 500 Oe at $l_1=2$ to 4 mm was obtained when the magnets 89 and 90 of the magnet unit 85 were made of an alnico material (an alloy of aluminum, nickel, cobalt, iron, titanium, and the like). When a magnet consisting of a rare earth material was used, a magnetic field equal to that described above was obtained at $l_1=5$ to 8 mm.

With the above arrangement, the magnet unit 85 is held at the parallel position in a state except for the write or erase mode of the disk 10. Abutment of the cartridge 2 of the disk 10 against the magnet unit 85 during conveyance of the disk 10 can be prevented. At the same time, the magnet unit 85 is rotated about the rotating shaft 87 to the predetermined angular position in the write or erase mode of the disk 10, so that the magnet 89 or 90 of the magnet unit 85 is set to be almost perpendicular to the recording film surface of the disk 10, so that the distance between one magnet 89 or 90 of the magnet unit 85 and the recording film surface of the disk 10 can be reduced. As compared with the conventional case wherein the external magnetic field unit is retracted from the path of the cartridge 2 of the disk 10 during conveyance of the disk 10, the magnet unit 85 serving as an external magnetic field unit can be made compact. In this case, an extra space for retracting the external magnetic field unit to the standby position need not be formed within the housing 3 of the optomagnetic disk apparatus 1. Therefore, the entire housing 3 can be made compact In the write or erase mode of the disk 10, the magnet unit 85 is rotated to the predetermined angular position and held in a direction almost perpendicular to the surface of the disk 10. The distal end of one magnet, e.g., the first magnet 89 of the magnet unit 85, is inserted inside the cartridge 2 through the opening 86 of the holder 20 and the window 2b of the cartridge 2 and located at a position spaced apart from the recording film surface of the disk 10 by the distance $l_1$. A relatively inexpensive magnet made of an alnico material can be used, thus resulting in low cost.

The mechanism described above can be used not only to move the magnets 89 and 90 toward and away from the disk 10, but also to apply an external magnetic field to the disk 10 or erase an external magnetic field. When the magnet unit 85 is in the position shown in FIG. 16, the magnet 89 applies a magnetic field to the disk 10. When the magnet unit 85 is rotated and set in the position shown in FIG. 17, the magnetic field generated by the magnets 89 and 90 is erased, whereby substantially no external magnetic fields are applied to the disk 10. When the magnet 85 is used only to apply a magnetic field to the disk 10, it need not have a flat cross section.

Figure 20A:
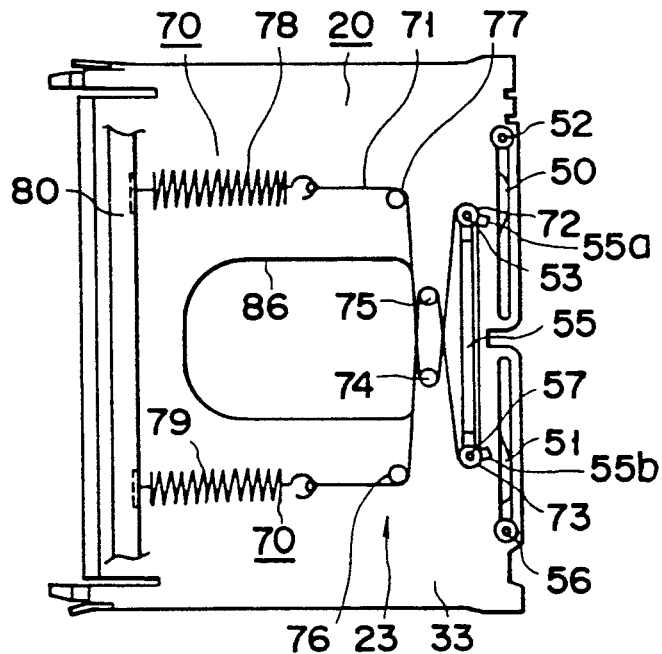
FIG. 20A is a plan view showing a second embodiment of a shutter opening/closing mechanism according to the present invention.
Figure 20B:
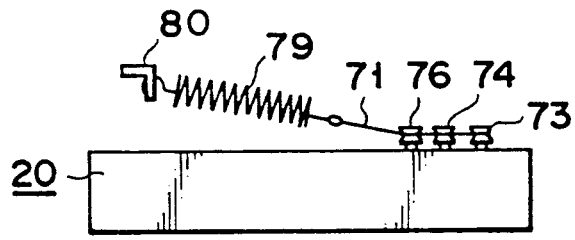
FIG. 20B is a side view of the shutter opening/closing mechanism shown in FIG. 20A.

FIGS. 20A and 20B illustrate a second embodiment of the present invention. This embodiment has two additional pulleys 74 and 75. The pulley 74 is located between pulleys 72 and 73. The pulley 75 is provided between pulleys 76 and 77. A wire 71 guided by the pulleys 72 and 73 is wrapped around the pulleys 74 and 75, with two portions crossing each other and guide by the pulleys 76 and 77.

Figure 20C:
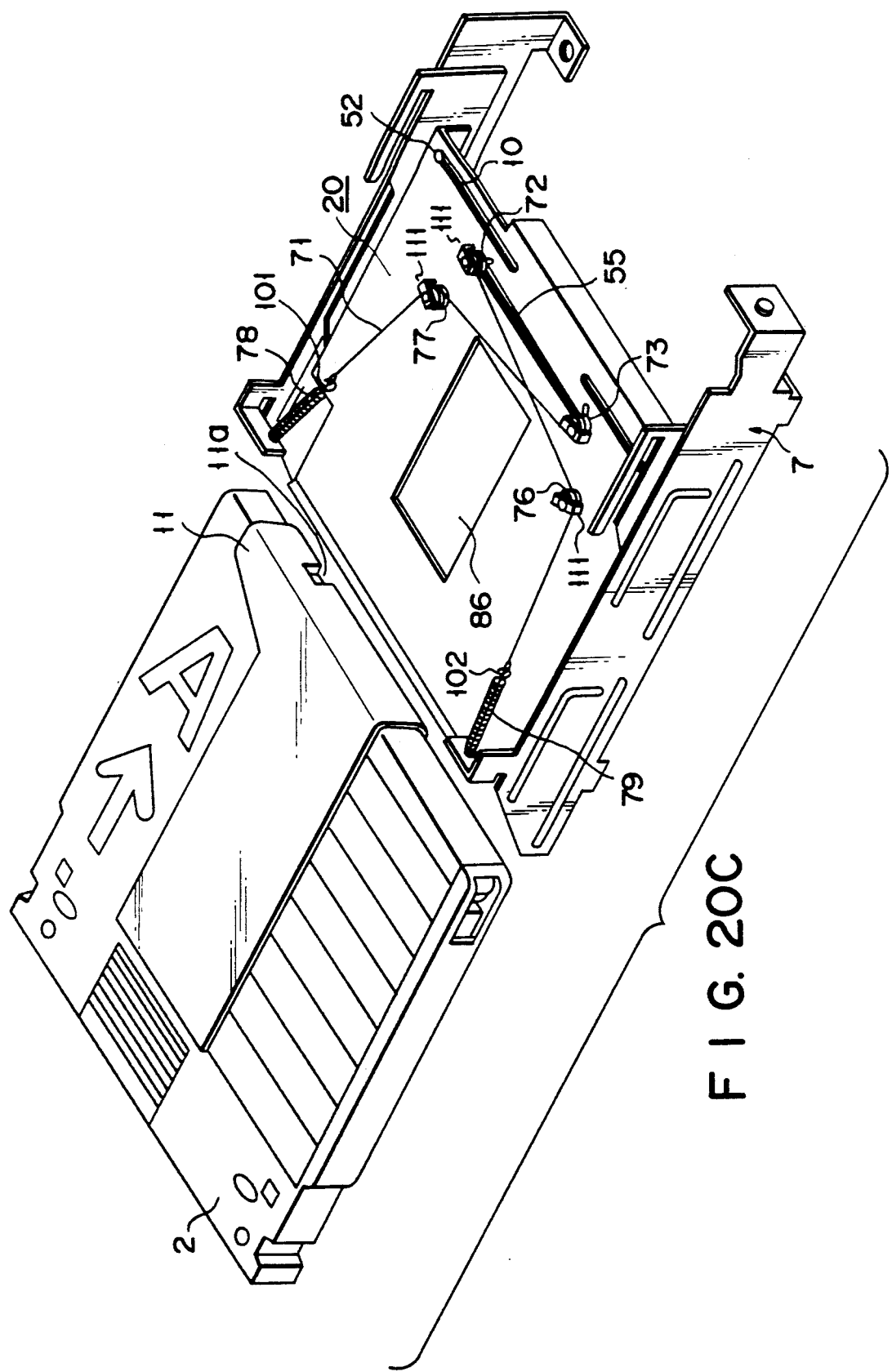
FIG. 20C is a respective view showing a third embodiment of a shutter opening/closing mechanism according to present invention.

FIG. 20C shows a third embodiment of the present invention. This embodiment has two stopper wires 101 and 102 and removal-preventing members 111. The wires 101 and 102, which will be described later in detail, pass through coil springs 78 and 79, respectively. The shutter closing/opening mechanism of the third embodiment is greatly reliable.

Figure 21:
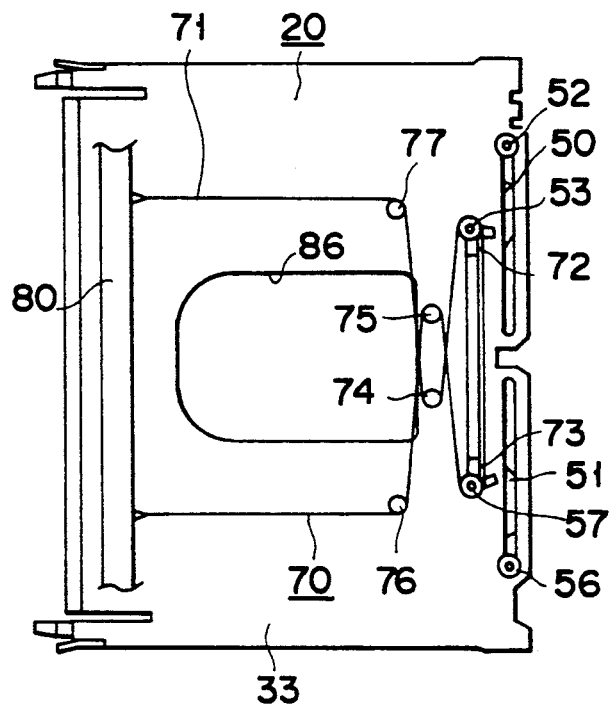
FIG. 21 is a plan view showing a fourth embodiment of a shutter opening/closing mechanism according to the present invention.
Figure 22:
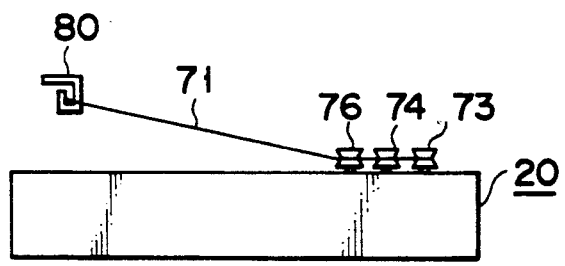
FIG. 22 is a side view of the shutter opening/ closing mechanism shown in FIG. 21.
Figure 23:
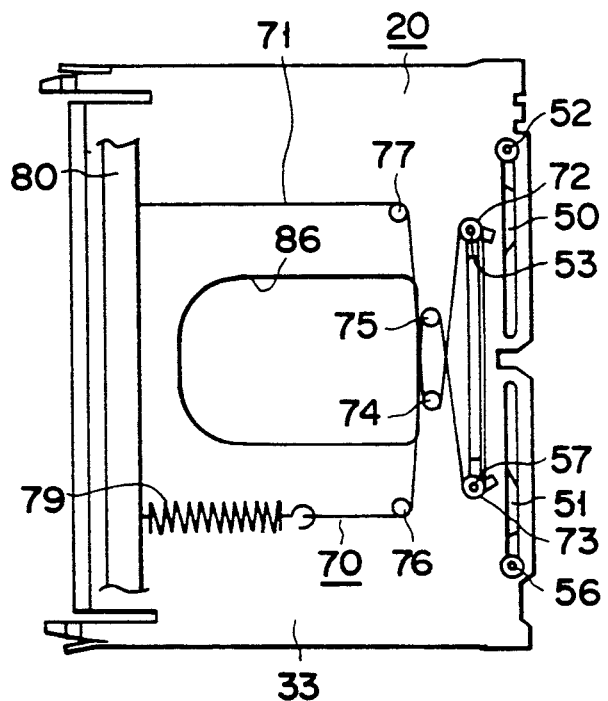
FIG. 23 is a plan view showing a fifth embodiment of a shutter opening/closing mechanism according to the present invention.
Figure 24:
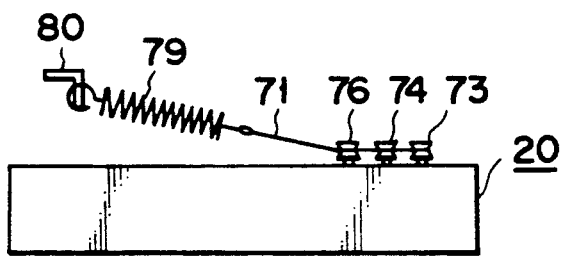
FIG. 24 is a side view of the shutter opening/closing mechanism shown in FIG. 23.

FIGS. 21 and 22 show a fourth embodiment of the shutter opening/closing mechanism of the cartridge 2. Both ends of a wire 71 of an opener moving means 70 are directly fixed to a stationary member, i.e., a stay 80 without using tension coil springs. FIGS. 23 and 24 show a fifth embodiment of the shutter opening/closing mechanism. One end of a wire 71 is directly fixed to a stay 80, and the other end is fixed thereto through a tension coil spring 79.

Figure 25:
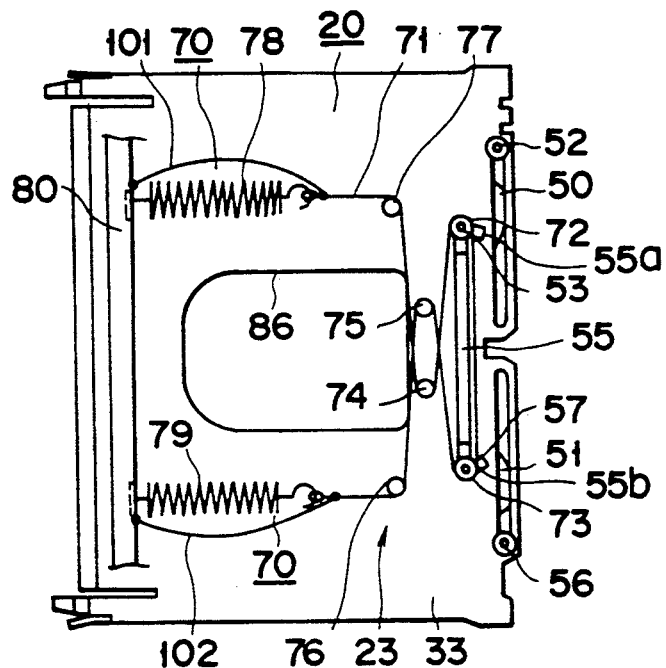
FIG. 25 is a plan view showing a sixth embodiment of a shutter opening/closing mechanism according to the present invention.
Figure 26:
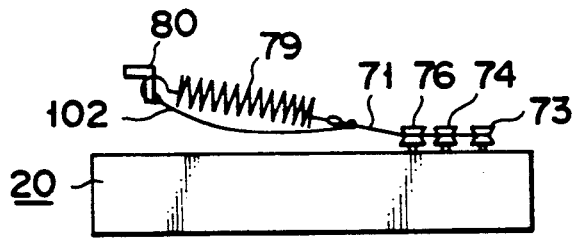
FIG. 26 is a plan view of the shutter opening/closing mecnanism shown in FIG. 25.
Figure 27:
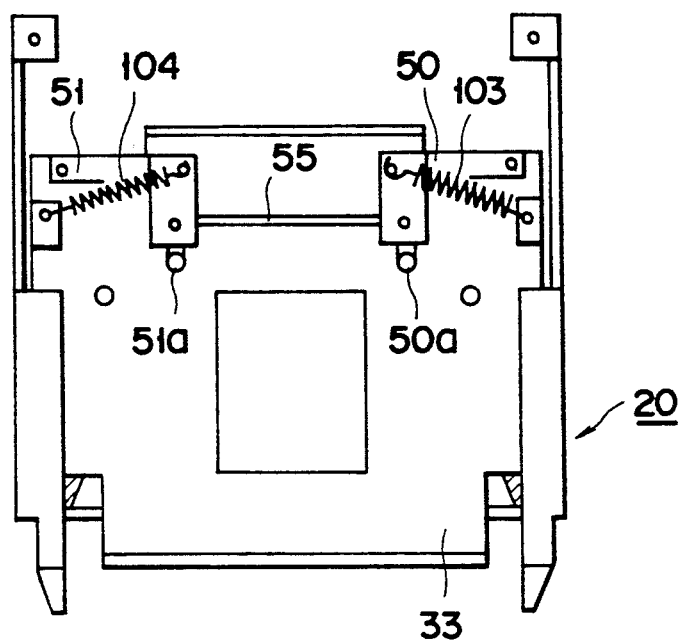
FIG. 27 is a bottom view of the shutter opening/closing shown in FIG. 25.

FIGS. 25 to 27 show a sixth embodiment of the shutter opening/closing mechanism. As shown in FIG. 27, springs, e.g., tension springs 103 and 104 are arranged on the lower surface of a holder 20 to separate shutter openers 50 and 51 from each other, i.e., in a shutter closing direction. Stopper wires 101 and 102 are arranged to be parallel to coil springs 78 and 79 connected to a wire 71. The stopper wires 101 and 102 connect both ends of the wire 71 and a stay 80. In a state wherein a cartridge 2 is not inserted, the coil springs 78 and 79 are kept taut. However, the biasing forces of the coil springs 78 and 79 which act on the shutter openers 50 and 51 are set to be smaller than biasing forces of the tension springs 103 and 104 which act on the shutter openers 50 and 51. As shown in FIG. 25, in the state wherein the cartridge is not inserted, the shutter openers 50 and 51 are held at positions spaced apart from each other by the biasing forces of the tension springs 103 and 104. The length of each of the stopper wires 101 and 102 is slightly larger than that of each of the coil springs 78 and 79 in this state.

In the above shutter opening/closing mechanism, when the cartridge is inserted and the holder 20 is moved, the coil springs 78 and 79 are extended, and the stopper wires 101 and 102 are changed from a loose state to a taut state. When the holder 20 is further moved, a tension of the wire 71 is increased and overcomes the biasing forces of the tension springs 103 and 104, and one of the shutter openers 50 and 51 is moved to open the shutter of the cartridge. In this embodiment, other arrangements and operations are the same as those described above. The shutter opening/closing mechanism of this embodiment is more reliable than the shutter opening/closing mechanisms of the previous embodiments. That is, in the state wherein the cartridge is not inserted in the shutter opening/closing mechanisms of the previous embodiments, a tension does not almost act on the wire 71, and the wire 71 becomes loose. In the worst case, the wire may be removed from the pulleys. However, in the shutter opening/closing mechanism of this embodiment, a tension always acts on the wire 71 even when the cartridge is not inserted. Therefore, there is no fear of removing the wire from the pulleys. In addition, in the shutter opening/closing mechanisms of the previous embodiments, the operation for closing the shutter of the cartridge depends on a biasing force of the spring incorporated in the cartridge. When the spring incorporated in the cartridge is damaged or the shutter is caught, the shutter may not be closed. However, in the shutter opening/closing mechanism of this embodiment, the shutter can be closed by the biasing forces of the tension springs 103 and 104. The above failure can be eliminated and reliability of the apparatus can be improved.

Figure 28:
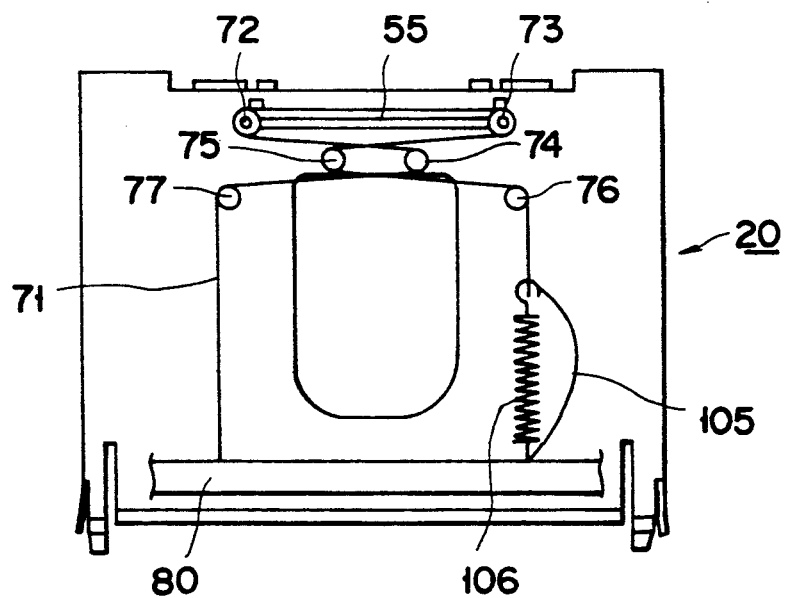
FIG. 28 is a plan view showing a seventh embodiment of a shutter opening/closing mechanism according to the present invention.

Still another embodiment of the shutter opening/closing mechanism having a tension spring and a stopper wire is shown in FIG. 28 to FIG. 31. That is, FIG. 28 shows a seventh embodiment of the shutter opening/closing mechanism. Only one end of a wire 71 is connected to a stay 80 through a coil spring 106 and a stopper wire 105. The other end of the wire 71 is directly connected to the stay 80.

An eight embodiment of the shutter opening/closing mechanism is shown in FIG. 29. In this embodiment, a mounting pin 107 extends from a holder 20 in place of one guide pulley 77. One end of a wire 71 is directly connected to the mounting pin 107.

FIG. 30 shows a ninth embodiment of the shutter opening/closing mechanism. In this embodiment, the guide pulleys 74 and 77 are omitted, and one end of a wire 71 is directly connected to a mounting pin 108 extending on a holder 20.

Figure 31:
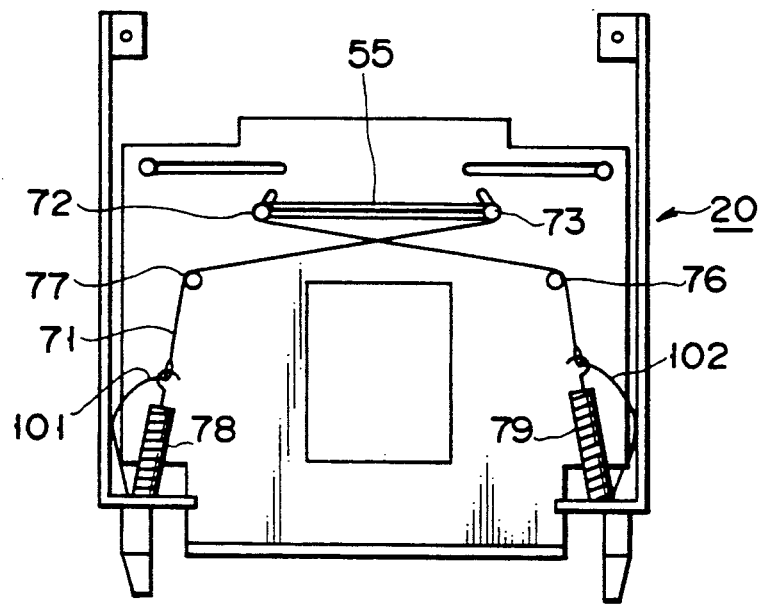
FIG. 31 is a plan view showing a tenth embodiment of a shutter opening/closing mechanism according to the present invention.

A tenth embodiment of the shutter opening/closing mechanism is shown in FIG. 31. The embodiment is characterized in that stopper wires 101 and 102, which are identical to those used in the third embodiment shown in FIG. 20C, are located outside coil springs 78 and 78.

The removal preventing members shown in FIG. 20C may be mounted on the guide pulleys 72 to 77 to assure prevention of removal of the wire 71.

Figure 32A:
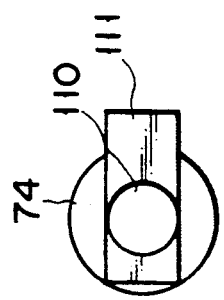
FIG. 32A is a plan view of a wire removal preventing mechanism.
Figure 32B:
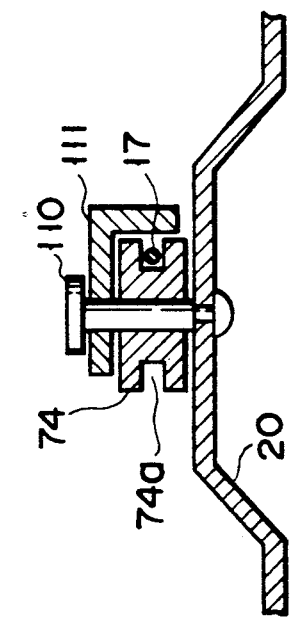
FIG. 32B is a longitudinal sectional view of the wire removal preventing mechanism shown in FIG. 32A.

FIGS. 32A and 32B show a removal preventing mechanism of the guide pulleys 74 to 77. A shaft 110 extends on a holder 20, and any of the above guide pulleys, e.g., the guide pulley 74, is rotatably supported by the shaft 110. An L-shaped removal preventing member 111 is mounted on the upper end portion of the shaft 110. The removal preventing member 111 is extended to cover a pulley groove 74a of the pulley 74 to prevent the wire 71 from being removed from the pulley groove 74a.

Figure 33A:
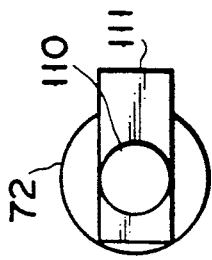
FIG. 33A is a plan view showing another wire removal preventing mechanism.
Figure 33B:
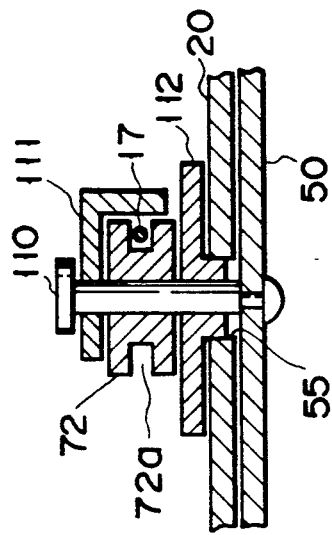
FIG. 33B is a longitudinal sectional view of the wire removal preventing mechanism shown in FIG. 33A.

FIGS. 33A and 33B show a removal preventing structure of the pulley 72 mounted on a shutter opener, e.g., the shutter opener 50. A shaft 110 extends through the shutter opener 50. A slider 112 is mounted on the shaft 110. The slider 112 is slidably fitted in the groove 55 of the holder 20. The pulley 72 is rotatably supported by the shaft 110. The same removal preventing member 111 shown in FIGS. 32A and 32B is mounted at the upper end of the shaft 110 to prevent a wire 17 from being removed from the pulley groove 72a.

Figure 34A:
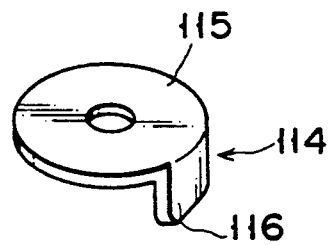
FIG. 34A is a perspective view showing still another wire removal preventing mechanism.
Figure 34B:
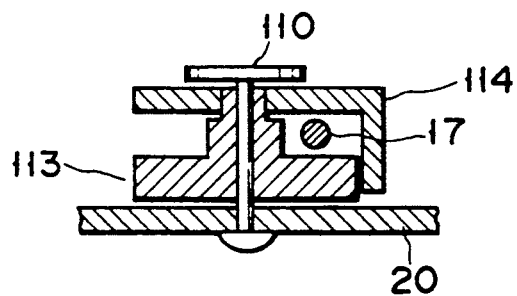
FIG. 34B is a longitudinal sectional view of the wire removal preventing mechanism shown in FIG. 34A.

Another arrangement of the removal preventing mechanism is shown in FIGS. 34A and 34B. In this arrangement, a removal preventing member 114 comprises a circular flange 115 and a removal preventing tongue 114. The flange 115 also serves as one flange of a pulley 113. This arrangement can facilitate removal/mounting of a wire 17.

Figure 35:
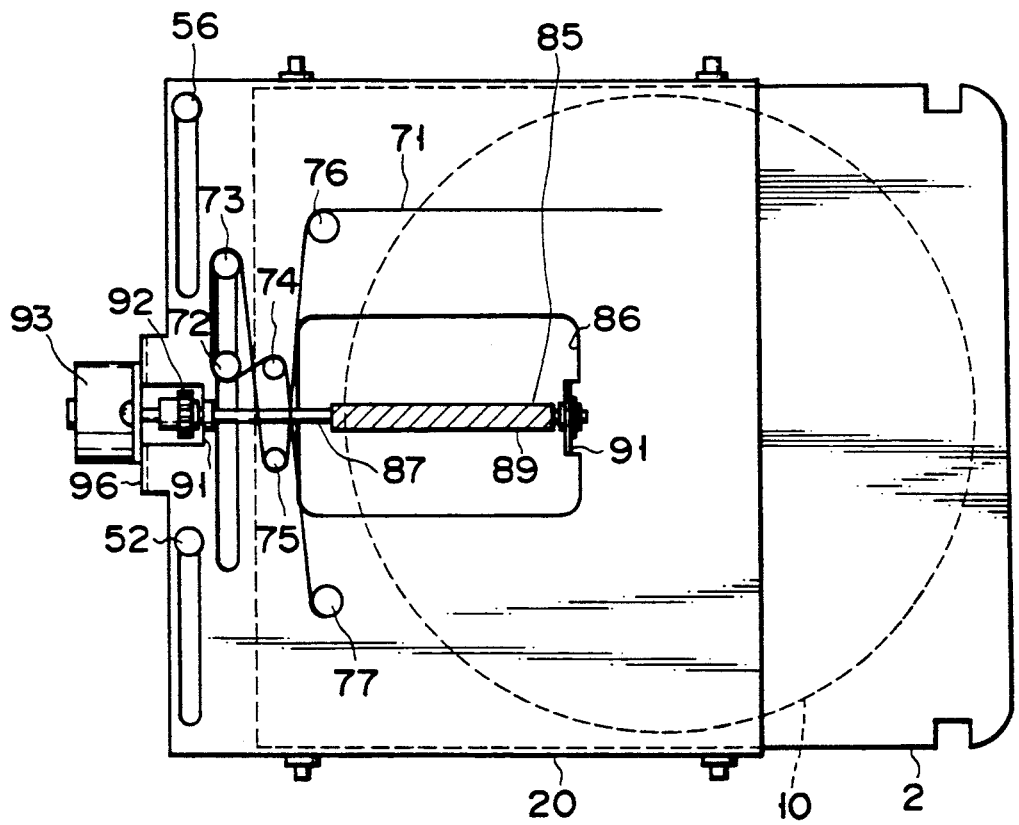
FIG. 35 is a plan view showing a second embodiment of a magnet unit drive mechanism.
Figure 36:
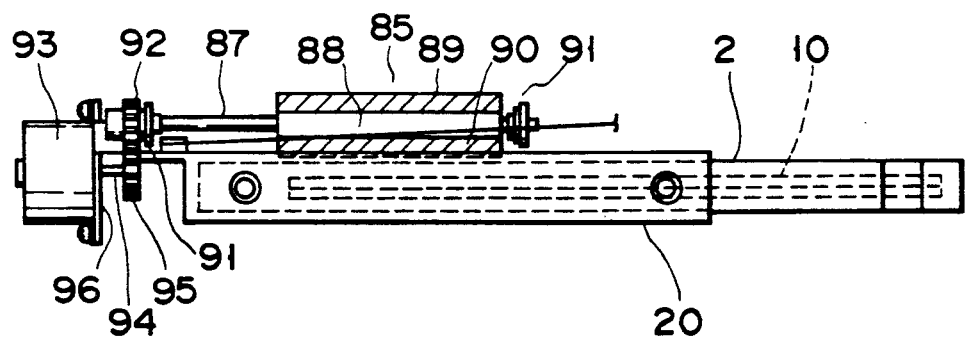
FIG. 36 is a side view of the drive mechanism shown in FIG. 35.
Figure 37:
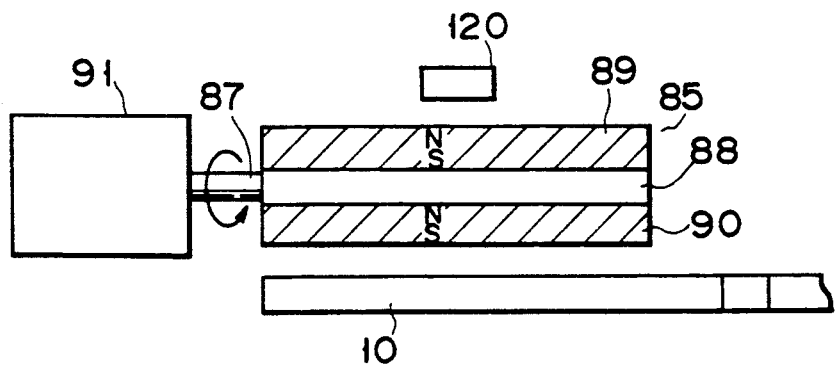
FIG. 37 is a schematic view showing a third embodiment of a magnet unit drive mechanism.

A second embodiment of a mechanism for supporting and moving a magnet unit 85 is shown in FIGS. 35 and 36. In this embodiment, the support/moving mechanism of the magnet unit 85 is mounted on a holder 20. A tongue is formed at the edge of an opening 86 of the holder 20, and the tongue is bent upward at a right angle to constitute a bearing 91. One end of a rotating shaft 87 of the magnet unit 85 is rotatably supported by the bearing 91. A motor mounting portion 96 bent upward at a right angle is also formed at the edge of the holder 20, and a stepping motor 93 is mounted on the motor mounting portion 96. Other arrangements of this embodiment are the same as those shown in FIGS. 16 to 20. In this embodiment, the mechanism for supporting and moving the magnet unit is integrally formed on the holder. Therefore, a relative position between the magnet unit and the optomagnetic disk in the cartridge can be accurate, and the structure can be simplified.

A third embodiment of the support/moving mechanism of the magnet unit is shown in FIGS. 37 to 40. In the mechanism shown in FIG. 37, a magnetic piece 120 is disposed near a magnet unit 85. The magnetic piece 120 is made of iron, nickel, cobalt, or any other ferromagnetic material. In this case, the magnetic piece 120 opposes the recording film surface of a disk 10 through the magnet unit 85. While the magnet unit 85 is kept stopped, one of first and second magnets 89 and 90 of the magnet unit 85 opposes the magnetic piece 120 at the nearest angular position. The other magnet opposes the disk 10. In this state, the magnet unit 85 is magnetically attracted between the first or second magnet 89 or 90 and the magnetic piece 120. The magnet unit 85 is positioned at a predetermined angular position by a magnetic attraction force. The attraction force acting between the magnetic piece 120 and the magnet unit 85 is weaker than a rotational torque of a stepping motor 91.

In this embodiment, the magnetic piece 120 is magnetically attracted to the magnet unit 85 by the magnetic force of the first or second magnet, respectively 89 or 90. The magnet unit 85 can be accurately position at the predetermined angular position. For this reason, in the erase or write mode, a magnetic field surface of the first or second magnet 89 or 90 of the magnet unit 85 can be accurately aligned in a direction parallel to the surface of the disk 10. Therefore, a perpendicular magnetic field can be accurately obtained, and the erase or write operation can be performed in optimal magnetic conditions.

Since the magnet unit 85 can be held at the predetermined angular position by magnetic attraction, the operation of the stepping motor 91 can be kept stopped except for magnetic field switching (rotation of the magnet unit 85) in the erase or write mode. Therefore, the stepping motor 91 need not be continuously energized in the erase or write mode, and a temperature rise of the stepping motor 91 can be prevented.

Figures 38, 39:
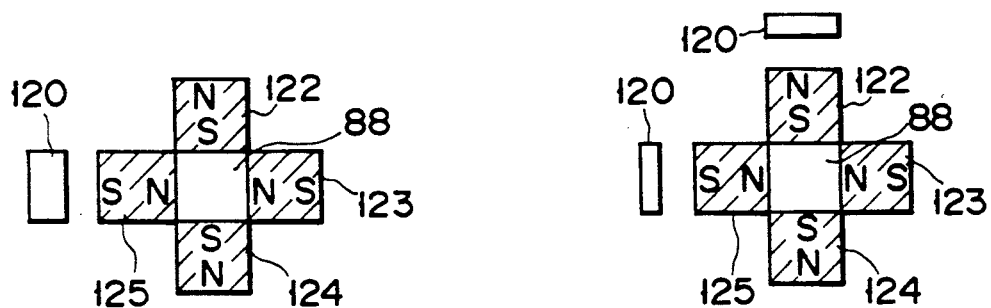
FIG. 38 is a view showing a modification of the third embodiment of the magnet unit shown in FIG. 37.
FIG. 39 is a view showing another modification of the third embodiment of the magnet unit shown in FIG. 37.
Figure 40:
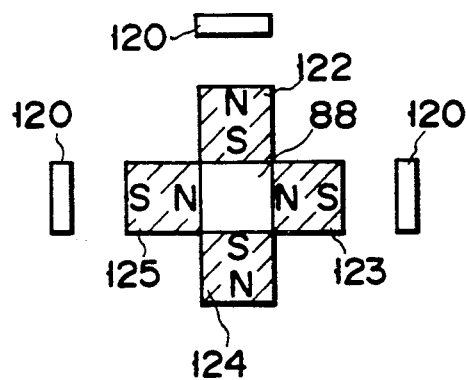
FIG. 40 is a view showing still another modification of the third embodiment of the magnet unit shown in FIG. 37.

In an embodiment shown in FIG. 38, permanent magnets 122 to 125 are mounted on four sides of a rectangular magnet holder 88, and polarities of the adjacent magnets are opposite to each other. One magnetic piece 120 is so located as to oppose any one of the permanent magnets 122 to 125 in a proximate state. The number of magnetic pieces 120 may be two (FIG. 39) or three (FIG. 40).

The present invention is not limited to the particular embodiments described above Various changes and modifications may be made without departing from the spirit and scope of the invention.

What is claimed is:

1. A disk apparatus for performing write or read access of information of a disk stored in a cartridge having an openable shutter, comprising:

a frame;

a cartridge holder for holding said cartridge, said cartridge holder being movable with respect to said frame;

means for moving said cartridge holder;

a shutter opener for opening or closing the shutter mounted on said cartridge holder and movable in a direction for opening/closing the shutter of said cartridge held in said cartridge holder, said shutter opener being provided with engaging means which are engaged with said shutter;

wire guiding means arranged on said shutter opener; and a wire looped between said wire guiding means such that at least part of said wire is mounted on said frame, said wire being kept in a path which extends around that portion of said disk which is exposed when said shutter is opened, wherein a tension of said wire is increased upon movement of said cartridge holder, said shutter opener being moved by the tension of said wire, and then said shutter is opened/closed.

2. An apparatus according to claim 1, wherein an end of said wire is connected to said frame through a tension coil spring.

3. An apparatus according to claim 1, wherein said wire is guided by pulleys having wire removal preventing members.

4. A disk apparatus for performing write or read access of information of a disk stored in a cartridge having an openable shutter, comprising:

a frame;

a cartridge holder for holding said cartridge, sid cartridge holder being movable with respect to said frame;

means for moving said cartridge holder;

a shutter opener for opening or closing the shutter mounted on said cartridge holder and movable in a direction for opening/closing a shutter of said cartridge held in said cartridge holder;

wire guiding means arranged on said shutter opener; and a flexible wire looped between said wire guiding means such that at least part of said flexible wire is mounted on said frame, said wire being applied with pretension;

wherein a tension of said wire is increased to be more than said pretension upon movement of said holder, said shutter opener being moved by the tension of said wire, and then said shutter is opened/closed.

5. An apparatus according to claim 4, wherein said shutter opener is biased in a direction for closing said shutter by springs, and ends of said wire are connected to said frame by stopper wires each having a free length larger than that of each of said tension coil springs.

6. An apparatus according to claim 4, wherein said wire is guided by pulleys having wire removal preventing members.

7. An optomagnetic disk apparatus for performing write or read access of information of an optomagnetic disk stored in a cartridge having an openable shutter, comprising:

a frame;

a cartridge holder for holding said cartridge, said cartridge holder being movable with respect to said frame;

means for moving said cartridge holder;

a magnet unit for applying an external magnetic field to said optomagnetic disk in an erase or write mode of information of said optomagnetic disk; and means for rotating said magnet unit, said magnet unit rotating means being arranged to rotate said magnet unit such that an external magnetic field is applied to said optomagnetic disk to write data on, or erase data from, said optomagnetic disk, when said optomagnetic disk is located at a predetermined position.

8. An apparatus according to claim 7, wherein said magnet unit and said magnet unit rotating means are mounted on said frame.

9. An apparatus according to claim 7, wherein said magnet unit and said magnet unit rotating means are mounted on said cartridge holder.

10. An apparatus according to claim 7, wherein a magnetic member is located near said magnet unit, and said magnet unit is held at a predetermined angular position by a magnetic attraction force between said magnetic member and said magnet unit.

11. An optomagnetic disk apparatus for performing read, erase, or write access of information of an optomagnetic disk stored in a cartridge having an openable shutter, comprising:

a frame;

a cartridge holder for holding said cartridge, said cartridge holder being movable with respect to said frame;

means for moving said cartridge holder;

a magnet unit for applying an external magnetic field to said optomagnetic disk in an erase or write mode of information of said optomagnetic disk, said magnet unit having a flat sectional shape; and means for rotating said magnet unit, said magnet unit rotating means being arranged to rotate said magnet unit such that a longitudinal direction of the flat sectional shape of said magnet unit is parallel to a surface of said optomagnetic disk in said cartridge when said cartridge is moved together with said holder, and to rotate said magnet unit such that the longitudinal direction is substantially perpendicular to the surface of said optomagnetic disk when the information is erased from or written in said optomagnetic disk.

12. An apparatus according to claim 11, wherein said magnet unit and said magnet unit supporting/moving means are mounted on said frame.

13. An apparatus according to claim 11, wherein said magnet unit and said magnet unit supporting/moving means are mounted on said cartridge holder.

14. An apparatus according to claim 11, wherein a magnetic member is located near said magnet unit, and said magnet unit is held at a predetermined angular position by a magnetic attraction force between said magnetic member and said magnet unit.

15. An optomagnetic disk apparatus for performing read, erase, or write access of information of an optomagnetic disk stored in a cartridge having an openable shutter, comprising:
 a frame;
 a cartridge holder for holding said cartridge, said cartridge holder being movable with respect to said frame;
 means for moving said cartridge holder;
 a magnet unit for applying an external magnetic field to said optomagnetic disk in an erase or write mode of information of said optomagnetic disk, said magnet unit having a flat sectional shape; and
 means for rotating said magnet unit, said magnet unit rotating means being arranged to rotate said magnet unit such that a longitudinal direction of the flat sectional shape of said magnet unit is parallel to a surface of said optomagnetic disk in said cartridge and said magnet unit is located outside said cartridge, when said cartridge is moved together with said holder, and to rotate said magnet unit such that the longitudinal direction is substantially perpendicular to the surface of said optomagnetic disk and part of said magnetic unit enters into said cartridge through an opening made in said cartridge, when the information is erased from or written in said optomagnetic disk.

16. An apparatus according to claim 15, wherein said magnet unit and said magnet unit supporting/moving means are mounted on said frame.

17. An apparatus according to claim 15, wherein said magnet unit and said magnet unit supporting/moving means are mounted on said cartridge holder.

18. An apparatus according to claim 15, wherein a magnetic member is located near said magnet unit, and said magnet unit is held at a predetermined angular position by a magnetic attraction force between said magnetic member and said magnet unit.

* * * * *

UNITED STATES PATENT AND TRADEMARK OFFICE
CERTIFICATE OF CORRECTION

PATENT NO. : 5,146,447

DATED : September 8, 1992

INVENTOR(S) : Makoto Nagasato et al.

It is certified that error appears in the above-identified patent and that said Letters Patent is hereby corrected as shown below:

On Title Page, Item [30], Foreign Application Priority Data, should be deleted.

Signed and Sealed this

Twenty-eighth Day of September, 1993

Attest:

BRUCE LEHMAN

*Attesting Officer*  *Commissioner of Patents and Trademarks*